(12) United States Patent
Ito et al.

(10) Patent No.: US 12,525,215 B2
(45) Date of Patent: Jan. 13, 2026

(54) SOUND ABSORBING MATERIAL AND METHOD OF PRODUCING SOUND ABSORBING MATERIAL

(71) Applicant: 3M INNOVATIVE PROPERTIES COMPANY, St. Paul, MN (US)

(72) Inventors: Akira Ito, Tokyo (JP); Keisuke Sawamoto, Kanagawa-ken (JP)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

(21) Appl. No.: 18/004,620

(22) PCT Filed: Jul. 8, 2021

(86) PCT No.: PCT/IB2021/056137
§ 371 (c)(1),
(2) Date: Jan. 6, 2023

(87) PCT Pub. No.: WO2022/009143
PCT Pub. Date: Jan. 13, 2022

(65) Prior Publication Data
US 2023/0267906 A1 Aug. 24, 2023

(30) Foreign Application Priority Data
Jul. 10, 2020 (JP) .................... 2020-119383

(51) Int. Cl.
*G10K 11/168* (2006.01)
*B29C 43/00* (2006.01)
(Continued)

(52) U.S. Cl.
CPC .......... *G10K 11/168* (2013.01); *B29C 43/003* (2013.01); *B29C 43/203* (2013.01);
(Continued)

(58) Field of Classification Search
CPC .... G10K 11/168; G10K 11/162; B60R 13/08; B60R 13/0815; B32B 5/26; B32B 5/08;
(Continued)

(56) References Cited

U.S. PATENT DOCUMENTS 4,242,398 A * 12/1980 Segawa ..................... B32B 5/26
428/218
4,813,948 A 3/1989 Insley
(Continued)

FOREIGN PATENT DOCUMENTS

EP 2574506 A1 * 4/2013 ......... B60R 13/0838
JP H1091169 A 4/1998
(Continued)

OTHER PUBLICATIONS

International Search Report for PCT International Application No. PCT/IB2021/056137, mailed on Oct. 11, 2021, 5 pages.
(Continued)

*Primary Examiner* — Edgardo San Martin
(74) *Attorney, Agent, or Firm* — Carlos M. Téllez Rodríguez; 3M Innovative Properties Co

(57) ABSTRACT

A sound absorbing material according to an embodiment is a sound absorbing material (1) absorbing sound from a component, the sound absorbing material including a rising portion (4) rising from an attachment portion P to which the sound absorbing material (1) is attached, and an opposing portion (5) opposing the component on a side of the rising portion (4) opposite to the attachment portion P, wherein each of the rising portion (4) and the opposing portion (5) includes a core layer (11) and a ventilation resistant layer (12), and in at least a part of the opposing portion (5) and the rising portion (4), a variation in thickness T of the ventilation resistant layer (12) is 40% or less of an average value of the thickness T of the ventilation resistant layer (12).

9 Claims, 12 Drawing Sheets

(51) Int. Cl.
   *B29C 43/20*  (2006.01)
   *B60R 13/08*  (2006.01)
   B29K 105/12  (2006.01)
   B29L 9/00    (2006.01)

(52) U.S. Cl.
   CPC .................. *B29K 2105/122* (2013.01); *B29K 2995/0067* (2013.01); *B29K 2995/0097* (2013.01); *B29L 2009/00* (2013.01)

(58) Field of Classification Search
   CPC ..... B32B 27/12; B29C 43/003; B29C 43/203; B29C 43/20; B29K 2105/122; B29K 2995/0065; B29K 2995/0067; B29K 2995/0097; B29L 2009/00
   See application file for complete search history.

(56) References Cited

U.S. PATENT DOCUMENTS

| | | | | |
|---|---|---|---|---|
| 5,652,415 | A * | 7/1997 | Pelzer | B32B 7/08 181/294 |
| 6,805,219 | B2 * | 10/2004 | Yasuda | F02F 7/006 181/204 |
| 7,677,358 | B2 * | 3/2010 | Tocchi | B60R 13/0861 181/290 |
| 7,954,596 | B2 * | 6/2011 | Schulze | G10K 11/168 181/290 |
| 7,963,363 | B2 * | 6/2011 | Niwa | B60R 13/0838 181/290 |
| 8,727,417 | B2 * | 5/2014 | Eguchi | B60R 13/0815 428/95 |
| 8,863,897 | B2 * | 10/2014 | Bertolini | G10K 11/002 181/290 |
| 9,637,068 | B2 * | 5/2017 | Rondeau | B32B 7/02 |
| 9,767,782 | B2 | 9/2017 | Takeda | |
| 9,805,708 | B2 * | 10/2017 | Kim | B32B 38/12 |
| 9,922,634 | B2 * | 3/2018 | Thompson, Jr. | G10K 11/168 |
| 10,525,905 | B2 | 1/2020 | Iwata et al. | |
| 2003/0077969 | A1 | 4/2003 | Tanaka | |
| 2004/0007421 | A1 * | 1/2004 | Ueno | F02F 7/006 181/204 |
| 2005/0136212 | A1 | 6/2005 | Wyerman et al. | |
| 2006/0169531 | A1 * | 8/2006 | Volker | G10K 11/172 181/204 |
| 2008/0236936 | A1 | 10/2008 | Niwa et al. | |
| 2009/0305595 | A1 | 12/2009 | Ogawa et al. | |
| 2011/0108359 | A1 | 5/2011 | Nishimura et al. | |
| 2011/0206891 | A1 | 8/2011 | Eguchi | |
| 2014/0124290 | A1 | 5/2014 | Inoue et al. | |
| 2017/0361785 | A1 | 12/2017 | Guigner et al. | |
| 2020/0086603 | A1 | 3/2020 | Seppi | |
| 2020/0122651 | A1 | 4/2020 | Delpero et al. | |
| 2024/0101196 | A1 * | 3/2024 | Grébert | B32B 27/12 |
| 2024/0274108 | A1 * | 8/2024 | Asai | G10K 11/168 |

FOREIGN PATENT DOCUMENTS

| | | | | |
|---|---|---|---|---|
| JP | 2003345363 | A | | 12/2003 |
| JP | 3613727 | B2 | | 1/2005 |
| JP | 3705419 | B2 | | 10/2005 |
| JP | 3705420 | B2 | | 10/2005 |
| JP | 2009057663 | A | | 3/2009 |
| JP | 5319091 | B2 | | 10/2013 |
| JP | 2016155461 | A | | 9/2016 |
| JP | 2020075367 | A | | 5/2020 |
| JP | 6753673 | B2 * | 9/2020 | G10K 11/16 |
| KR | 101439066 | B1 * | 9/2014 | G10K 11/168 |

OTHER PUBLICATIONS

Schiavi, "Considerations on the airflow resistivity measurement of porous and fibrous materials as function of temperature", EURONOISE 2009, Oct. 26, 2009, XP55844254, 11 pages.

Office Action from counterpart European Application No. 21749297.4 dated Jan. 28, 2025, 6 pps.

JIS Handbook 8 Architecture I (Materials), Japan, Japan Standards Association, Jan. 31, 2001 959, p. 960.

* cited by examiner

SOUND ABSORBING MATERIAL AND METHOD OF PRODUCING SOUND ABSORBING MATERIAL

CROSS REFERENCE TO RELATED APPLICATIONS

This application is a national stage filing under 35 U.S.C. 371 of PCT/IB2021/056137, filed Jul. 8, 2021, which claims the benefit of Japanese Application No. 2020-119383, filed Jul. 10, 2020, the disclosure of which is incorporated by reference in its/their entirety herein.

TECHNICAL FIELD

The present disclosure relates to a sound absorbing material and a method of producing the sound absorbing material.

BACKGROUND ART

Various sound absorbing materials are known that suppress noise and the like. Japanese Patent Document JP 2009-57663 A describes a laminated sound absorbing member. The laminated sound absorbing member includes a sound absorbing material and a ventilation resistant membrane coupled to a surface of the sound absorbing material. The ventilation resistant membrane is located further on a sound source side than the sound absorbing material. The ventilation resistant membrane is produced by mixing the melt-blown fibers having a fiber diameter of 10 μm or less with binder fibers to form a web having a weight per unit area of 50 to 250 g/m$^2$, heating and pressurizing the web, and adjusting solidity to 10% or greater.

Japanese Patent Document JP 2016-155461 A describes an automotive silencer formed by pressing and including a first and a second molding surfaces that are opposite to each other in the thickness direction. The automotive silencer includes at least a first fiber layer on which the first molding surface is formed, and a second fiber layer integrated with a surface opposite to the first molding surface of the first fiber layer, the second fiber layer including fibers in part thereof.

SUMMARY OF INVENTION

However, some of possible sound sources of noise or the like, for example, vehicle components, have a complex constitution. In a case where a sound absorbing material is applied to such a possible sound source, the sound absorbing material may have a three-dimensional shape. Specifically, the sound absorbing material may have a 3D shape including a surface substantially parallel to a placement surface for the sound absorbing material and a surface facing a direction intersecting the placement surface for the sound absorbing material. In a case where the 3D shaped sound absorbing material includes the ventilation resistant membrane described above, the ventilation resistant membrane may vary in thickness during formation. Consequently, there is room for improvement in sound absorbing performance.

A embodiment of the present disclosure provides a sound absorbing material absorbing sound from a component, the sound absorbing material including a rising portion rising from an attachment portion to which the sound absorbing material is attached, and an opposing portion opposing the component on a side of the rising portion opposite to the attachment portion, wherein each of the rising portion and the opposing portion includes a core layer and a ventilation resistant layer, and in at least a part of the opposing portion and the rising portion, a variation in thickness of the ventilation resistant layer is 40% or less of an average value of the thickness of the ventilation resistant layer.

The sound absorbing material according to this embodiment includes the rising portion rising from the attachment portion, and the opposing portion opposing the component. Thus, the three-dimensional shape of the sound absorbing material allows the sound absorbing material to be used even for components having complicated shapes. Each of the rising portion and the opposing portion includes the core layer and the ventilation resistant layer. Therefore, the sound absorbing performance can be improved by using the ventilation resistant layer to appropriately suppress ventilation while using the core layer to absorb sound. In at least a part of the ventilation resistant layer, a variation in thickness of the ventilation resistant layer is 40% or less of the average value of the thickness. In this case, at least a part of the ventilation resistant layer has a constant variation in thickness, enabling an increase in sound absorption coefficient of the ventilation resistant layer. Thus, the sound absorbing performance can be improved.

In the sound absorbing material according to another embodiment, in 80% or greater of a region of the sound absorbing material that includes the opposing portion and the rising portion and that includes no edge portions, the variation in the thickness of the ventilation resistant layer may be 40% or less of the average value.

In the sound absorbing material according to another embodiment, the ventilation resistant layer may have a thickness of 1 mm or greater and 6 mm or less.

In the sound absorbing material according to another embodiment, the ventilation resistant layer may have a ventilation resistance value in a range of a reference value±120 Rayls.

In the sound absorbing material according to another embodiment, the ventilation resistant layer may have a ventilation resistance value of 300 Rayls or greater and 1100 Rayls or less.

In the sound absorbing material according to another embodiment, the ventilation resistant layer may be positioned on a side of the component as viewed from the core layer.

In the sound absorbing material according to another embodiment, at least one of the ventilation resistant layer and the core layer may include microfibers.

An embodiment of the present disclosure provides a method of producing a sound absorbing material including a core layer and a ventilation resistant layer, the method including the steps of: preparing a material constituting the ventilation resistant layer; holding, on a first mold, the material constituting the ventilation resistant layer and forming the ventilation resistant layer; and holding, between the ventilation resistant layer and a second mold, a material constituting the core layer and forming the core layer.

In the method of producing the sound absorbing material according to this embodiment, first, the material of the ventilation resistant layer is held on the first mold to form the ventilation resistant layer. Consequently, by holding the material on the first mold to form the ventilation resistant layer first, the thickness of the ventilation resistant layer can be made constant using the first mold. Subsequently, the second mold is used to form the core layer on the ventilation resistant layer with the constant thickness. Consequently, a sound absorbing material can be produced that includes the ventilation resistant layer with the constant thickness and the core layer and that has high sound absorbing performance.

The forming of the ventilation resistant layer may include adjusting the thickness of the ventilation resistant layer using a press or using a calendar roll and the press.

According to an aspect of the present disclosure, the sound absorbing performance can be improved.

DESCRIPTION OF EMBODIMENTS

Figure 1:
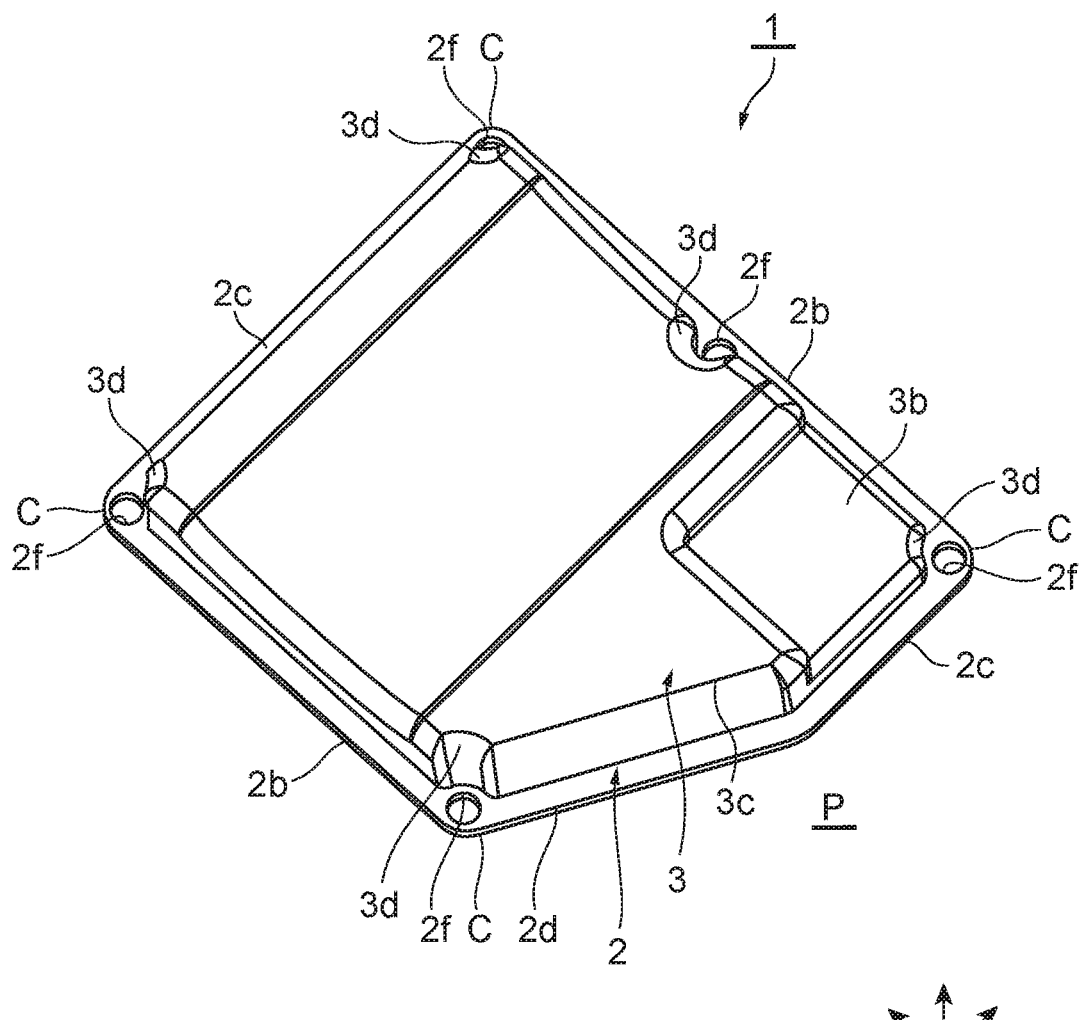
FIG. 1 is a perspective view illustrating an example of a sound absorbing material according to an embodiment.
Figure 1:
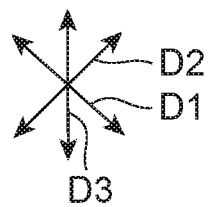

Embodiments of a sound absorbing material and a method of producing a sound absorbing material according to the present disclosure will be described below in detail with reference to the drawings. The present disclosure is not limited to the embodiments described below, is described in the scope of claims, and is intended to include the scope of claims and all modifications equivalent to the scope of claims. In the description of the drawings, the same or equivalent elements are denoted by the same reference signs and redundant explanation will be omitted as appropriate. Additionally, parts of the drawings may be drawn in a simplified or exaggerated manner for ease of understanding, and a dimensional ratio and the like are not limited to those described in the drawings.

The sound absorbing material according to an embodiment absorbs sound from a component. In an embodiment, "component" refers to a component that emits sound and from which the sound is to be absorbed. For example, the "component" may be a mechanical component, an automotive component, an electrical component, or an electronic component, and the type of the "component" is not limited. As a further specific example, the "component" may be a component of an automobile, an airplane, or a building board.

The sound absorbing material includes a rising portion that rises from an attachment portion to which the sound absorbing material is attached. "Attachment portion" refers to a portion to which the sound absorbing material is attached. "Rising portion" refers to a portion that includes a surface that is rising relative to the attachment portion and intersecting with the attachment portion. The sound absorbing material includes an opposing portion opposing the component on a side of the rising portion opposite to the attachment portion. For example, the "opposing portion" refers to a top surface portion of the sound absorbing material having a concavo-convex shape.

Furthermore, another example of an object to which the sound absorbing material is attached is any of: a door panel, an aircraft frame, a wall insulating material, an integrated duct, a transport device (an aircraft, a rotor craft, or a train); an electronic device (television, computer, or server), a storage device, a power supply device, an air conditioning system, upholstery, a personal protection device, clothing, a blanket, and furniture. An example of a place where the sound absorbing material is attached may be an element surrounding the above-described structure example, such as a carpet or a trunk liner.

Furthermore, other objects to which the sound absorbing material is attached may include a fender liner, a front surface of a dashboard, a floor system, a wall panel, a duct insulating material, a liner, a head liner, an airplane panel, a drape, ceiling tiles, or further applications thereof. A material for the sound absorbing material may be similar to a filter material or a material used for a surgical drape, a wipe, or a liquid and gas filter.

FIG. 1 is a perspective view of an example sound absorbing material 1. As illustrated in FIG. 1, the sound absorbing material 1 absorbs sound from a component. As an example, the sound absorbing material 1 may be a molded panel. For example, the sound absorbing material 1 is disposed covering the component and absorbs sound from the component in a state of covering the component. As an example, the sound absorbing material 1 is shaped like a pentagon having five corners C. However, the shape of the sound absorbing material 1 may be a polygon such as a triangle, a square, or a hexagon; or a circle or an ellipse, and is not particularly limited.

For example, the sound absorbing material 1 may be a sound absorbing material provided for noise suppression inside an automobile or noise suppression outside the automobile. Furthermore, a component to be subjected to noise suppression may be a component of a vehicle, and the sound absorbing material 1 may be disposed in an engine room of the vehicle. However, the sound absorbing material 1 is not limited to automobiles, and can be used in various objects and in various applications.

The example sound absorbing material 1 exhibits a concavo-convex shape (three-dimensional shape or 3D shape) that includes an edge portion 2 opposing an attachment portion P and a protruding portion 3 protruding from the edge portion 2. The concavo-convex shape as described above allows the sound absorbing material 1 to reliably cover even a component having a complicated shape to conform to the shape. As an example, the sound absorbing material 1 is disposed in a gap formed inside the engine room.

For example, the edge portion 2 includes: a pair of first sides 2b extending in a first direction D1 corresponding to a direction along the attachment portion P; and a pair of second sides 2c extending in a second direction D2 intersecting the first direction D1 along the attachment portion P. For example, one of the first sides 2b and one of the second sides 2c are respectively shorter than the other of the first sides 2b and the other of the second sides 2c, and the sound absorbing material 1 further includes a slanted side 2d extending from the one of the second sides 2c toward the one of the first sides 2b. However, the shape of the edge portion 2 is not limited to the For example, a hole portion 2f through which fixing means for fixing the sound absorbing material 1 with respect to the component is inserted is formed in the edge portion 2. The hole portion 2f passes through a third direction D3 that intersects both the first direction D1 and the second direction D2. Note that the third direction D3 corresponds to a direction in which the sound absorbing material 1 protrudes or recesses with respect to the component and may be, for example, an out-of-plane direction of the attachment portion P. As an example, the edge portion 2 may include a plurality of the hole portions 2f, and at least some of the plurality of hole portions 2f may be formed in the corners C of the sound absorbing material 1. In the example illustrated in FIG. 1, the hole portion 2f is formed at each of both end portions of each first side 2b and the intermediate portion of the longer first side 2b of the pair of first sides 2b.

The protruding portion 3 includes: a first protruding portion 3b protruding from the edge portion 2; and a second protruding portion 3c protruding further from the first protruding portion 3b. The sound absorbing material 1 may include a depression (recess portion) in at least one of the regions of the first protruding portion 3b and the second protruding portion 3c. A recess portion 3d depressed along a circumferential direction of the hole portion 2f is formed in a portion of each of the first protruding portion 3b and the second protruding portion 3c that opposes the hole portion 2f. As an example, the first protruding portion 3b is formed around one of the corners C of the sound absorbing material 1. The first protruding portion 3b may be formed in a portion of the longer first side 2b of the pair of first sides 2b on the corner C side and in a portion of the shorter second side 2c of the pair of second sides 2c. However, the shape of the sound absorbing material 1 is not limited to the example described above and can be changed as appropriate.

Figure 2:
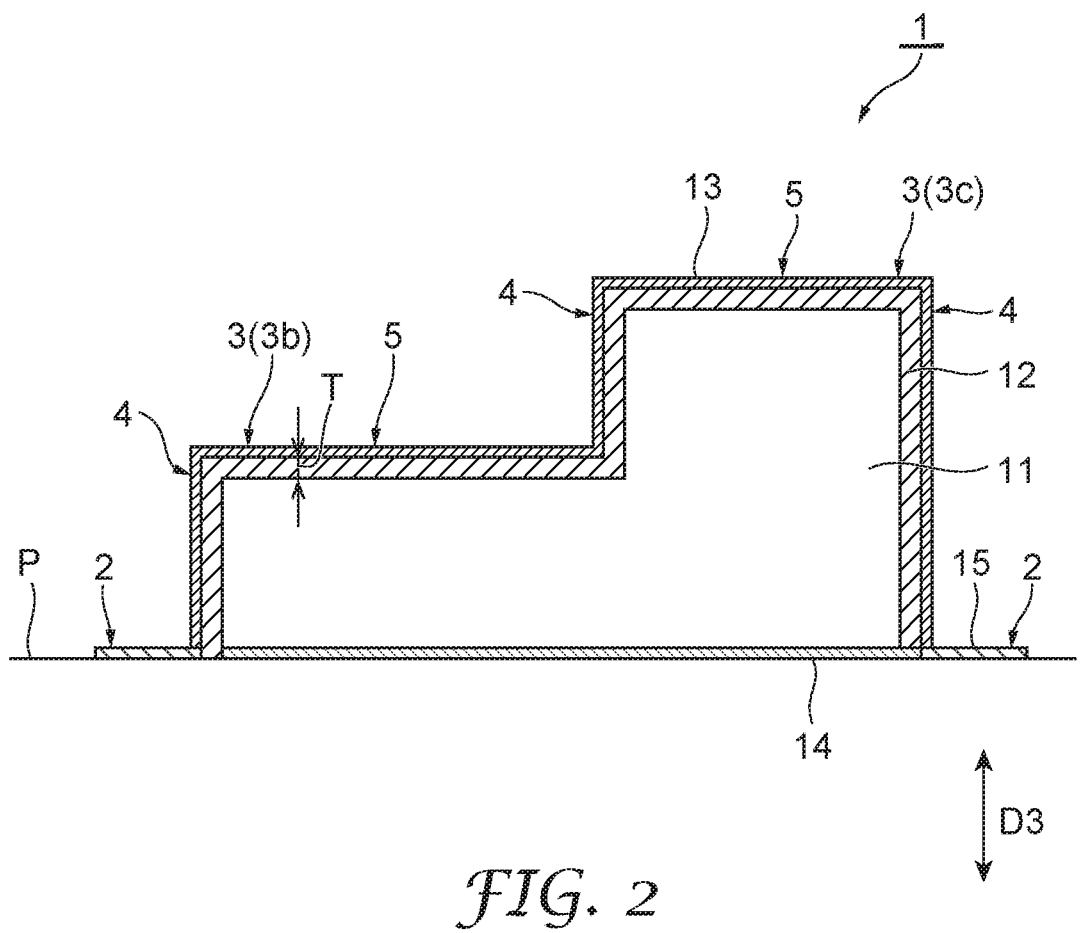
FIG. 2 is a cross-sectional view illustrating another example of the sound absorbing material according to the embodiment.

FIG. 2 is a cross-sectional view illustrating an example of a sound absorbing material 1 that is simplified. As described above, the sound absorbing material 1 includes the edge portion 2, the first protruding portion 3b, and the second protruding portion 3c. Each of the first protruding portion 3b and the second protruding portion 3c includes the rising portion 4 rising from the edge portion 2 in the third direction D3, and an opposing portion 5 extending from the top portion of the rising portion 4 in the first direction D1 and the second direction D2, and opposing the component. The component is provided on the attachment portion P side (the lower side in FIG. 2) of the opposing portion 5 in the third direction D3.

Each of the rising portion 4 and the opposing portion 5 includes, for example, a core layer 11, a ventilation resistant layer 12, a first cover layer 13, a second cover layer 14, and a thin plate layer 15. Note that the example thin plate layer 15 is a layer formed by collapsing, at the edge portion 2, the core layer 11, the ventilation resistant layer 12, the first cover layer 13, and the second cover layer 14. As described above, the sound absorbing material 1 including the ventilation resistant layer 12 is formed into a 3D shape.

The sound absorbing material 1 is a sound absorbing material formed into a 3D shape and in which a variation in thickness T of the ventilation resistant layer 12 is ±40% or less of the average value of the thickness T. Specifically, in at least a part of the rising portion 4 and the opposing portion 5, the variation in the thickness T of the ventilation resistant layer 12 is 40% or less of the average value of the thickness T. For example, in 80% or greater of the region of the sound absorbing material 1 that includes the rising portions 4 and the opposing portions 5 and that includes no edge portions 2, the variation in the thickness T of the ventilation resistant layer 12 may be 40% or less of the average value. Note that FIG. 2 illustrates an example in which the thickness T of the ventilation resistant layer 12 is constant at all locations other than a portion corresponding to the thin plate layer 15 of the sound absorbing material 1.

In the embodiment, as described above, the variation in the thickness T of the ventilation resistant layer 12 is suppressed. Note that the variation in the thickness T of the ventilation resistant layer 12 may be 35% or less, 30% or less, 25% or less, 20% or less, 15% or less, 10% or less, 5% or less, 3% or less, 2% or less, or 1% or less of the average value of the thickness T. Additionally, the variation in the thickness T of the ventilation resistant layer 12 may be 40% or less of the average value thereof, in 85% or greater, 90% or greater, 95% or greater, 97% or greater, 98% or greater, or 99% or greater of the region of the sound absorbing material 1 that includes the rising portions 4 and the opposing portions 5 and that includes no edge portions 2.

As an example, the thickness T of the ventilation resistant layer 12 is 1 mm or greater and 6 mm or less. The ventilation resistance value of the ventilation resistant layer 12 is in a range of, for example, the reference value±120 Rayls. The "reference value" is the ventilation resistance value of the reference ventilation resistant layer adjusted to deliver the desired sound absorbing performance and used as a reference, and may be defined in accordance with the thickness of the core layer 11. The "reference value" may be a value determined by experimentation in advance or may be a value determined by simulation.

Additionally, the ventilation resistance value of the ventilation resistant layer 12 may be 300 Rayls or greater and 1100 Rayls or less. However, the thickness T of the ventilation resistant layer 12 and the ventilation resistance value of the ventilation resistant layer 12 can be changed as appropriate as described below. Additionally, the thickness T of the ventilation resistant layer 12 and the ventilation resistance value of the ventilation resistant layer 12 may be defined in accordance with the core layer 11 (e.g., the thickness of the core layer 11, etc.).

The material of each of the first cover layer 13 and the second cover layer 14 is not particularly limited. As an example, the first cover layer 13 is composed of spun-bond nonwoven fabric, and the second cover layer 14 is composed of SMS nonwoven fabric. The first cover layer 13 and the second cover layer 14 are provided to cover the core layer 11 and the ventilation resistant layer 12. As an example, the color of the first cover layer 13 is black, and the color of the second cover layer 14 is white.

At least one of the first cover layer 13, the second cover layer 14, and the thin plate layer 15 may be omitted. For example, instead of at least one of first cover layer 13 and second cover layer 14, a membrane different from the first cover layer 13 and the second cover layer 14 may be formed by spraying on at least one of core layer 11 and ventilation resistant layer 12. For example, for the thickness in the third direction D3, the core layer 11 is thickest, the ventilation resistant layer 12 is the second thickest, and the first cover layer 13 and the second cover layer 14 are thinnest.

The sound absorbing material 1 provided with the core layer 11 and the ventilation resistant layer 12 exhibits a high sound absorbing property in a frequency band of 100 Hz or greater and 3000 Hz or less, for example. For example, the ventilation resistant layer 12 may be a layer that enhances the sound absorbing property of the core layer 11 by being coupled to a surface of the core layer 11 on one side. As an example, the ventilation resistant layer 12 is coupled to a component-side surface corresponding to a sound source as viewed from the core layer 11, that is, a component-side (sound source side) surface of the core layer 11.

The type of the core layer 11 is not particularly limited, and various sound absorbing materials can be used as the core layer 11. For example, the core layer 11 may be nonwoven fabric, a felt material, a urethane foam material, microfibers, or a combination thereof. The example core layer 11 may include at least one of melt-blown fibers, staple fibers, and binder fibers. The core layer 11 may be a sound absorbing material having a lower ventilation resistance than the ventilation resistant layer 12. The thickness of the core layer 11 is not particularly limited, but is determined by, for example, constraints on the space in which the sound absorbing material 1 is installed. As an example, the thickness of the core layer 11 is a few mm or greater and several dozens of mm or less.

The ventilation resistant layer 12 is composed of, for example, melt-blow (melt-blown) microfibers. Both the core layer 11 and the ventilation resistant layer 12 may be composed of melt-blown microfibers, or only one of the core layer 11 and the ventilation resistant layer 12 may be composed of melt-blown microfibers. Note that the ventilation resistant layer 12 may be composed of nanofibers generated by an electrospinning method. However, in a case where the ventilation resistant layer 12 is provided with melt-blown microfibers as described above, this contributes to improved performance and a reduced weight of the sound absorbing material 1.

The example ventilation resistant layer 12 may include at least one of melt-blown fibers, staple fibers, and binder fibers. The binder fibers may be dispersed in the melt-blown fibers or may be at least partly fusion bonded by melt-blown fibers. The binder fibers may function as a binder by fusion bonding at least a part of the binder fibers to high-melting-point melt-blown fibers.

The melt-blown fibers of the ventilation resistant layer 12 may be a resin having a higher melting point than the part of the binder fibers that is fusion bonded, and a fibrous material can be used that is produced using a melt-blow method. "Melt-blow method" refers to a method in which the fibers are processed to have a smaller fiber diameter by melting a resin raw material and blowing a high-temperature air stream against the fibrous resin extruded from a nozzle.

The ventilation resistant layer 12 functions to improve the sound absorbing property of the sound absorbing material 1 by increasing the ventilation resistance of the sound absorbing material 1. For example, the ventilation resistant layer 12 is an acoustic member shaped like a thin film. As an example, the ventilation resistant layer 12 includes melt-blown fibers having a fiber diameter of 10 μm or less; binder fibers dispersed in the melt-blown fibers and at least partly fusion bonded to the melt-blown fibers; and staple fibers.

The fiber material of the staple fibers may be any of polyester, polyamide, acrylic, polypropylene, polyethylene, and the like. However, the stable fibers preferably include polyester fibers in view of weather resistance, flame retardancy, and recyclability. The staple fibers have a fiber thickness of, for example, 1 denier or greater and 100 denier or less.

The staple fibers preferably have a large fiber thickness in terms of processability and handleability, and, in particular, for increased productivity using a fiber opening machine, the staple fibers preferably have a fiber thickness of 3 denier or greater and 50 denier or less. Note that the staple fibers may have a small fiber thickness in terms of a sound absorbing property, and in particular, for an improved sound absorbing property at 200 to 1500 Hz, which corresponds to a low sound range, thin staple fibers of 15 denier or less are preferable.

The staple fibers preferably have a fiber length of 30 mm or greater and 100 mm or less in terms of processability and handleability. The shape of the fiber cross-section of the staple fibers may have a modified fiber cross-section having any of a circular shape, a T shape, and a flat shape, or may be hollow. The staple fibers may be crimped fibers, and for example, a crimp state may be of a corrugated type, a spiral type, or compromise between the corrugated type and the spiral type. An excessively small number of crimps may lead to insufficient elasticity and hardness, whereas an excessively great number of crimps may lead to a processing trouble. For example, staple fibers with 5 to 200 crimps/25 mm and more preferably 10 to 50 crimps/25 mm are used.

Fibers having, at least on a part of the surface, a lower melting point than that of the high-melting-point melt-blown fibers can be used as the binder fibers included in the ventilation resistant layer 12. For example, binders can be used that have, in a low-melting-point portion, a melting point lower than that of the melt-blow fibers by 10° C. or higher (or 20° C. or higher). For example, low-melting-point polyethylene terephthalate (PET), polypropylene (PP), polyethylene (PE), or the like can be used as the low-melting-point portion of the binder fibers. For example, in a case where polybutylene terephthalate (PBT) having a melting point of approximately 220° C. or polypropylene having a melting point of approximately 160° C. is used as the melt-blown fibers, low-melting-point polyethylene terephthalate (PET) having a surface melting point of 110° C. can be used as the binder fibers. Note that in a case where the sound absorbing material is used for a vehicle, the binder fibers may have a melting point of 90° C. or higher, 100° C. or higher, or 120° C. or higher in order to withstand environmental resistance testing.

The binder fibers may be fibrous, and the cross-sectional diameter and length of the binder fibers are not particularly limited. In view of improved dispersibility, the binder fibers may be short fibers. As the binder fibers, staple fibers can be used that have a fiber length of 10 mm or greater and 100 mm or less and that are produced by cutting spun fibers. The fibrous binders partly have a high contact density with the melt-blown fibers, enabling efficient fusion bonding between the fibers. This allows for a reduction in the amount of binder fibers required. The binder fibers need not be a material entirely having a uniform melting point and may include a low-melting-point layer at least on the surface of fibers. For example, the fibers may have a core-in-sheath structure, and a sheath portion may exclusively have a low melting point. In a case where fibers having such a core-insheath structure are used, when the fibers are mixed with melt-blown fibers, only the low-melting-point binders of the sheath portion are melted, with a core portion remaining as fibers together with the melt-blown fibers. This enables ventilation resistance to be improved without affecting the properties of the melt-blown fibers.

Note that the partly meltable binder fibers bond between the melt-blown fibers by being melted and thus exert the effect of further enhancing the ventilation resistance of the melt-blown fibers. In addition, the melt-blow fibrous structure can be fixed, the ventilation resistance property can further be stabilized and handling can be facilitated.

The example ventilation resistant layer 12 is produced from a web obtained by mixing three components of: melt-blown fibers, staple fibers, and binder fibers and having a weight per unit area of 50 g/m² or greater and 250 g/m² or less. As an example, the ventilation resistant layer 12 has a solidity of 10% or greater. "Solidity" is the value (percentage) determined by dividing the bulk density of the web by the density of the material constituting the web. "Solidity" may be an indicator for fillability, hermeticity, and breathability within the web.

The ventilation resistant layer 12 may have a polymer nonwoven fabric layer, and the polymer nonwoven fabric layer may be produced by a melt-blow process. The melt-blown nonwoven fiber layer may include very thin fibers. In melt-blow, a thermoplastic polymer stream is extruded from an orifice of a die and is attenuated by a converging stream of hot air to form thin fibers. The ventilation resistant layer 12 may be composed of melt-spun yarn, and for the melt-spun yarn, the nonwoven fabric fibers may be extruded as a series of filaments. The extruded melt-spun yarn is cooled and solidified to form fibers.

The fibers produced from the melt-spun yarn as described above may be spun-bonded. The web including a set of melt-spun yarn fibers are collected as a fibrous web. The ventilation resistant layer 12 may include melt-spun fibers. The resin constituting these fibers may include, for example, polyolefin such as polypropylene or polyethylene; polyester, polyethylene terephthalate, polybutylene terephthalate, polyamide, polyurethane, polybutene, polylactic acid, polyphenylene sulfide, polysulfone, a liquid crystal polymer, polyethylene-co-vinyl acetate, polyacrylonitrile, cyclic polyolefin, or a copolymer or mixture thereof. The ventilation resistant layer 12 may be made produced a thermoplastic semi-crystalline polymer. The thermoplastic semi-crystalline polymer includes semi-crystalline polyester or aliphatic polyester.

The molecular weight of the aliphatic polyester described above is not particularly limited. The molecular weight may be, for example, 15000 (g/mol) or greater and 6000000 g/mol or less; 20000 (g/mol) or greater and 2000000 g/mol or less; or 40000 (g/mol) or greater and 1000000 g/mol or less. The molecular weight may be 25 (g/mol) or greater. Furthermore, the molecular weight may be any of 15000 (g/mol), 20000 (g/mol), 25000 (g/mol), 30000 (g/mol), 35000 (g/mol) 40000 (g/mol), 45000 (g/mol), 50000 (g/mol), 60000 (g/mol), 70000 (g/mol), 80000 (g/mol) 90000 (g/mol), 100000 (g/mol) 200000 (g/mol) 500000 (g/mol) 700000 (g/mol) 1000000 (g/mol) 2000000 (g/mol), 3000000 (g/mol), 4000000 (g/mol), 5000000 (g/mol), and 6000000 (g/mol).

The ventilation resistant layer 12 may include a nonwoven fiber layer, and the diameter of the fibers of the nonwoven fiber layer is not particularly limited. The diameter may be, for example, 0.1 µm or greater and 10 µm or less; 0.3 µm or greater and 6 µm or less; or 0.3 µm or greater and 3 µm or less. The diameter may be less than 0.1 µm. Furthermore, the diameter may be any of 0.2 µm, 0.3 µm, 0.4 µm, 0.5 µm, 0.6 µm, 0.7 µm, 0.8 µm, 0.9 µm, 1 µm, 1.5 µm, 2 µm, 2.5 µm, 3 µm, 3.5 µm, 4 µm, 4.5 µm, 5 µm, 5.5 µm, 6 µm, 6.5 µm, 7 µm, 7.5 µm, 8 µm, 8.5 µm, 9 µm, 9.5 µm, 10 µm, 11 µm, 12 µm, 13 µm, 14 µm, 15 µm, 16 µm, 17 µm, 18 µm, 19 µm, 20 µm, 22 µm, 25 µm, 27 µm, 30 µm, 32 µm, 35 µm, 37 µm, 40 µm, 42 µm, 45 µm, 47 µm, 50 µm, 53 µm, 55 µm, 57 µm, and 60 µm.

The ventilation resistant layer 12 may have a porous polymer (which may be a porous layer). That is, the ventilation resistant layer 12 may be a layer in which a large number of fine holes are formed inside. The ventilation resistant layer 12 may be a perforated film or an interconnected cell foam. In a case where the ventilation resistant layer 12 includes fine holes, the holes may have an average diameter of 10 µm or greater and 5000 µm or less. Additionally, the average diameter of the holes may be any of 10 µm, 15 µm, 20 µm, 25 µm, 30 µm, 35 µm, 40 µm, 45 µm, 50 µm, 55 µm, 60 µm, 70 µm, 80 µm, 90 µm, 100 µm, 110 µm, 120 µm, 150 µm, 170 µm, 200 µm, 300µ, 350 µm, 400 µm, 500 µm, 600 µm, 700 µm, 800 µm, 900 µm, 1000 µm, 1500 µm, 2000 µm, 3000 µm, 4000 µm, and 5000 µm. The shape of the hole is not limited to a circle, but may be a polygon or an oval.

In a case where the ventilation resistant layer 12 has holes, the ventilation resistant layer 12 may have a porosity of, for example, 0.1% or greater and 80% or less, 0.2% or greater and 70% or less, or 0.5% or greater and 60% or less. Additionally, the porosity of the ventilation resistant layer 12 may be any of 0.2%, 0.3%, 0.4%, 0.5%, 0.7%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, and 80%.

The ventilation resistant layer 12 may have a bending elastic modulus of, for example, 0.2 GPa or greater and 10 GPa or less, 0.2 GPa or greater and 7 GPa or less, or 0.2 GPa or greater and 4 GPa or less. Furthermore, the bending elastic modulus of the ventilation resistant layer 12 may be any of 0.3 GPa, 0.4 GPa, 0.5 GPa, 0.6 GPa, 0.7 GPa, 1 GPa, 2 GPa, 3 GPa, 4 GPa, 5 GPa, 6 GPa, 7 GPa, 8 GPa, 9 GPa, 10 GPa, 12 GPa, 15 GPa, 17 GPa, 20 GPa, 25 GPa, 30 GPa, 35 GPa, 40 GPa, 50 GPa, 60 GPa, 70 GPa, 80 GPa, 90 GPa, 100 GPa, 120 GPa, 140 GPa, 160 GPa, 180 GPa, 200 GPa, and 210 GPa.

Polymer may be added to the ventilation resistant layer 12 to provide bending elasticity. The polymer may include, for example, at least one of polyolefin, polyester, fluoropolymer, polylactic acid, polyphenylene sulfide, polyacrylate, polyvinyl chloride, polycarbonate, polyurethane, and a blend thereof.

The ventilation resistant layer 12 may be composed of fiber-glass. The ventilation resistant layer 12 may constitute a Helmholtz resonator. The ventilation resistant layer 12 includes at least either organic particles or inorganic particles, and thus has an excellent sound wave absorbing property over a wide range of frequency bands. The porous layer of the ventilation resistant layer 12 may include at least either organic particles or inorganic particles. In this case, the sound wave absorbing property can be synergistically achieved.

The ventilation resistant layer 12 may include at least one of a polymer composition and an inorganic composition. The ventilation resistant layer 12 may be shaped like a film. The ventilation resistant layer 12 may include through holes. The ventilation resistant layer 12 may include at least one of clay particles, diatomaceous earth, a plant-based filler, non-layered silicate, unexpanded graphite, and porous and/or fine particles thereof. In the ventilation resistant layer 12, at least one of the clay particles, diatomaceous earth, plant-based filler, non-layered silicate, unexpanded graphite, and porous and/or fine particles thereof may form voids in a porous medium, the voids generating an acoustic absorption profile. The configuration of the acoustic absorption profile can be adjusted by a combination of particle properties.

As another example, the ventilation resistant layer 12 may include at least one of a fibrous nonwoven fabric layer and adhesive fibers. The fibers may be composed of polypropylene, polyethylene terephthalate, styrene-isoprene-styrene, or a polyethylene/polypropylene copolymer. In a case where the above-described profile of the ventilation resistant layer 12 is formed from fine particles, the composition of the particles, the surface area of the particles, and the size of the particles are not particularly limited. The example ventilation resistant layer 12 may include a filler, and the filler has a particle size of 1 µm or greater and 100 µm or less. The ventilation resistant layer 12 may have a specific surface area of 0.1 m$^2$/g or greater and 800 m$^2$/g or less.

The ventilation resistant layer 12 may have a ventilation resistance value of 100 MKS Rayls or greater and 8000 MKS Rayls or less. The ventilation resistance value of the ventilation resistant layer 12 may be 100 MKS Rayls or greater and 8000 MKS Rayls or less; 20 MKS Rayls or greater and 3000 MKS Rayls or less; or 50 MKS Rayls or greater and 1000 MKS Rayls or less. Additionally, the ventilation resistance value of the ventilation resistant layer 12 may be any of 20 MKS Rayls, 30 MKS Rayls, 40 MKS Rayls, 50 MKS Rayls, 70 MKS Rayls, 100 MKS Rayls, 200 MKS Rayls, 300 MKS Rayls, 400 MKS Rayls, 500 MKS Rayls, 600 MKS Rayls, 700 MKS Rayls, 1000 MKS Rayls, 1100 MKS Rayls, 1200 MKS Rayls, 1500 MKS Rayls, 1700 MKS Rayls, 2000 MKS Rayls, 3000 MKS Rayls, 3500 MKS Rayls, 4000 MKS Rayls, 5000 MKS Rayls, 5500 MKS Rayls, 6000 MKS Rayls, 6500 MKS Rayls, 7000 MKS Rayls, 7500 MKS Rayls, and 8000 MKS Rayls.

The filler in the ventilation resistant layer 12 may be non-uniformly dispersed in the porous layer of the ventilation resistant layer 12. The ventilation resistant layer 12 may include a nonwoven fibrous web. The filler may be diatomaceous earth, a plant-based filler, unexpanded graphite, polyolefin foam, or a combination thereof. Furthermore, the filler in the ventilation resistant layer 12 may be: 1 mass % or greater and 99 mass % or less; 10 mass % or greater and 90 mass % or less; 15 mass % or greater and 85 mass % or less; 20 mass % or greater and 80 mass % or less; 1 mass % or less; 1 mass % or greater; or 2 mass %, 3 mass %, 4 mass %, 5 mass %, 7 mass %, 10 mass %, 12 mass %, 15 mass %, 20 mass %, 30 mass %, 35 mass %, 40 mass %, 45 mass %, 50 mass %, 55 mass %, 60 mass %, 65 mass %, 70 mass %, 75 mass %, 80 mass %, 85 mass %, 90 mass %, 95 mass %, 97 mass %, 98 mass %, or 99 mass % or less. The filler in the ventilation resistant layer 12 may be at least one of clay, diatomaceous earth, graphite, glass foam, a fine filler such as a porous filler; a polymer filler, non-layered silicate, a plant-based filler, and a combination thereof.

As described above, the ventilation resistant layer 12 may include a porous layer, and an average inter-fiber distance in the porous layer may be greater than 0 µm and 100 µm or less. The ventilation resistant layer 12 may have an average inter-fiber distance of: 1 µm or greater and 1000 µm or less; 10 µm or greater and 500 µm or less; or 20 µm or greater and 300 µm or less. Furthermore, the average inter-fiber distance in the ventilation resistant layer 12 may be any of 1 µm, 2 µm, 3 µm, 4 µm, 5 µm, 7 µm, 10 µm, 11 µm, 12 µm, 15 µm, 17 µm, 20 µm, 25 µm, 30 µm, 35 µm, 40 µm, 45 µm, 50 µm, 60 µm, 70 µm, 80 µm; 90 µm, 100 µm 110 µm, 120 µm, 130 µm 150 µm 170 µm, 200 µm, 250 µm, 300 µm, 400 µm, 450 µm, 500 µm, 600 µm, 700 µm, 800 µm, 900 µm, and 1000 µm.

As described above, the ventilation resistant layer 12 may be composed of fine particles. In this case, the ventilation resistant layer 12 may have an average particle spacing of: 20 µm or greater and 4000 µm or less; 50 µm or greater and 2000 µm or less; or 100 µm or greater and 1000 µm or less. The average particle spacing in the ventilation resistant layer 12 may be less than 20 µm; 20 µm or less; or greater than 4000 µm. Additionally, the average particle spacing in the ventilation resistant layer 12 may be any of 25 µm, 30 µm, 35 µm, 40 µm, 45 µm, 50 µm, 60 µm, 70 µm, 80 µm, 90 µm, 100 µm, 110 µm, 120 µm, 150 µm, 170 µm, 200 µm, 250 µm, 300 µm, 350 µm, 400 µm, 450 µm, 500 µm, 600 µm, 700 µm, 800 µm, 900 µm, 1000 µm, 1100 µm, 1200 µm, 1500 µm, 1700 µm, 2000 µm, 2500 µm, 3000 µm, 3500 µm, and 4000 µm.

Although the thickness T of the ventilation resistant layer 12 is illustrated above, the thickness T is not particularly limited to the value described above. Furthermore, the thickness T of the example ventilation resistant layer 12 may be 1 µm or greater and 10 cm or less; 30 µm or greater and 1 cm or less; or 50µ or greater and 500 µm or less. The thickness T of the ventilation resistant layer 12 may be any of 1 µm, 2 µm, 5 µm, 10 µm, 20 µm, 30 µm, 40 µm, 50 µm, 100 µm, 200 µm, 500 µm, 1 mm, 2 mm, 5 mm, 10 mm, 20 mm, 50 mm, 70 mm, and 100 mm.

In a case where the ventilation resistant layer 12 includes the filler described above, the absorbing performance can be improved for sound in various frequency bands. The frequency band of sound in which the ventilation resistant layer 12 exhibits high sound absorbing performance may be 50 Hz or greater and 500 Hz or less; or 500 Hz or greater. The frequency of the sound to which the ventilation resistant layer 12 is directed may be any of 50 Hz, 55 Hz, 60 Hz, 65 Hz, 70 Hz, 75 Hz, 80 Hz, 85 Hz, 90 Hz, 95 Hz, 100 Hz, 105 Hz, 110 Hz, 115 Hz, 120 Hz, 125 Hz, 130 Hz 135 Hz, 140 Hz, 145 Hz, 150 Hz, 155 Hz, 160 Hz, 165 Hz, 170 Hz, 175 Hz, 180 Hz, 185 Hz, 190 Hz, 195 Hz, 200 Hz, 230 Hz, 240 Hz, 250 Hz, 260 Hz, 270 Hz, 280 Hz, 290 Hz, 300 Hz, 400 Hz, 500 Hz, 700 Hz, 1000 Hz, 2000 Hz, 3000 Hz, 4000 Hz, 5000 Hz, 7000 Hz, and 10000 Hz.

The ventilation resistant layer 12 may include a nonwoven fabric layer or may include glass fibers. The glass fibers are typically produced by fusing silica or other mineral in a furnace. The fused silica or the like may be produced by passing and extruding silica through a spinneret including a small orifice to generate a melt flow and guiding and cooling the melt flow through a flow of hot air. The characteristics of the ventilation resistant layer 12 have been described above. However, the core layer 11 may be provided with the characteristics described above.

Figure 3:
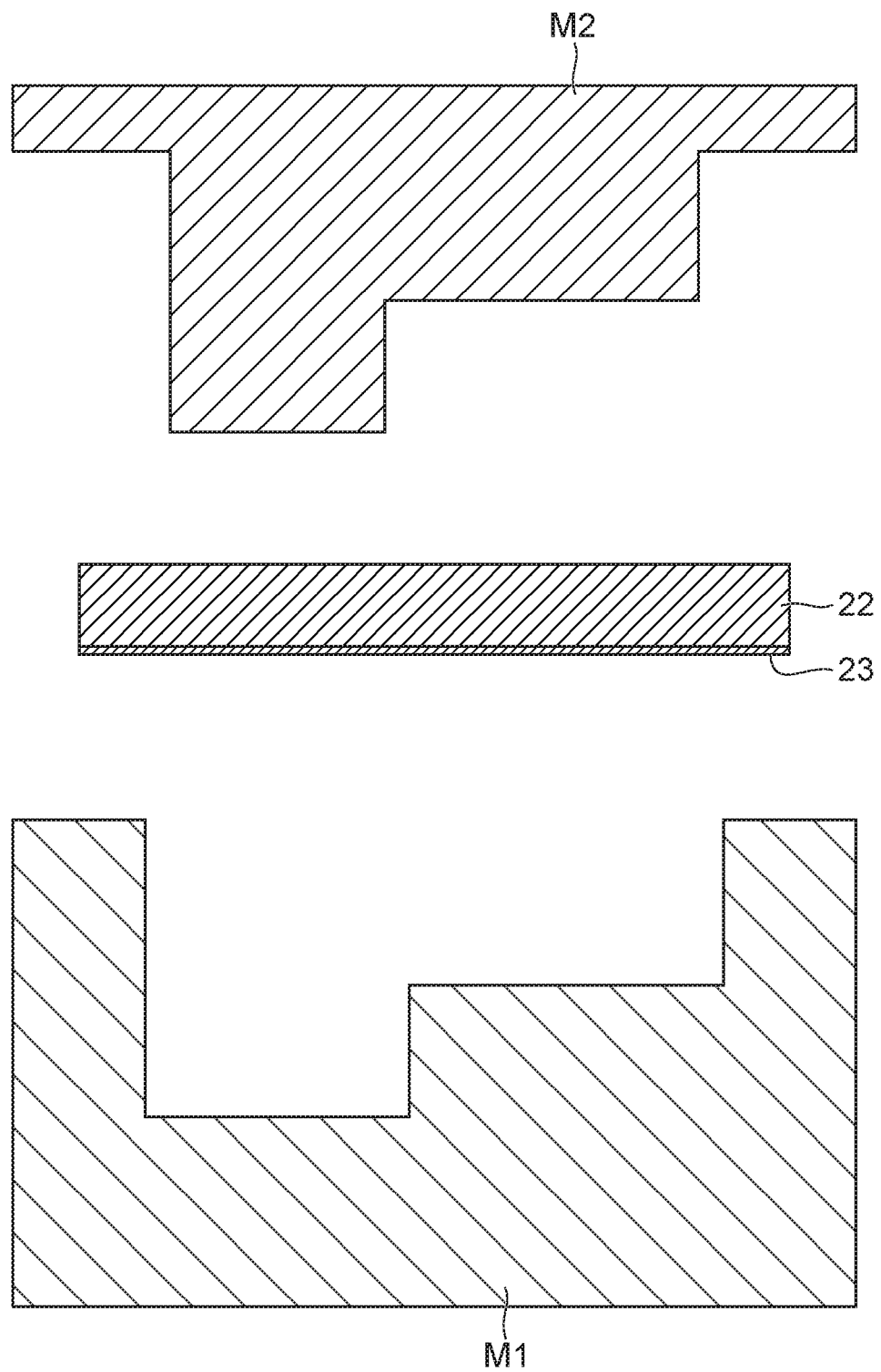
FIG. 3 is a diagram illustrating an example procedure of a method of producing a sound absorbing material according to an embodiment.
Figure 4:
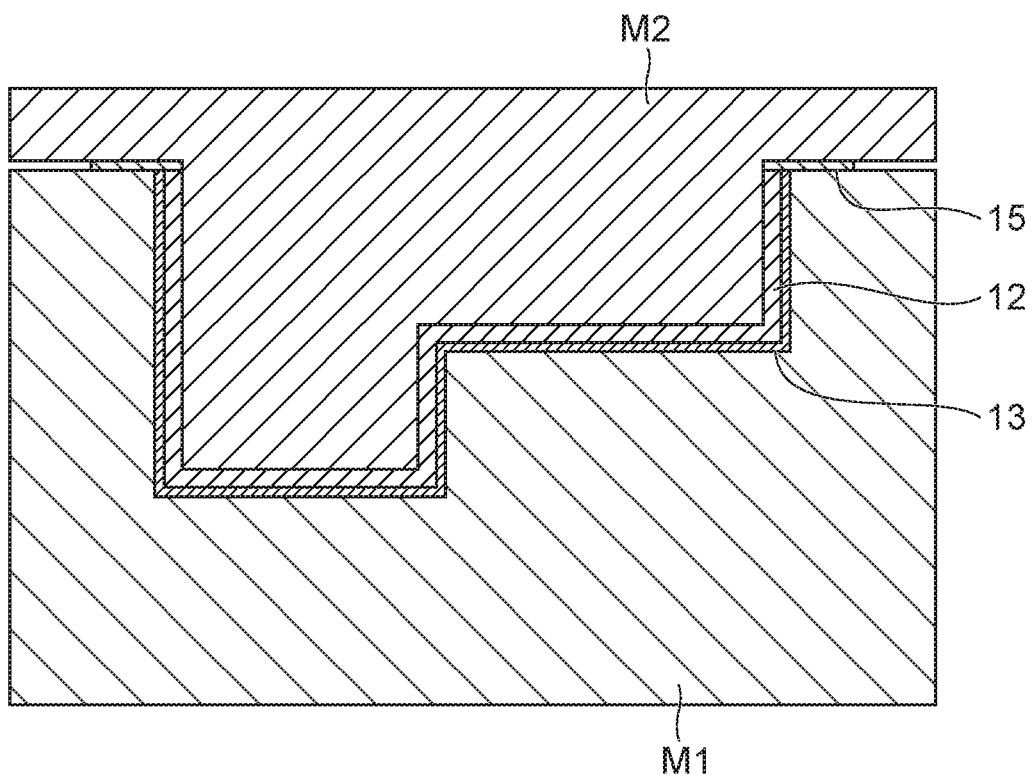
FIG. 4 is a diagram illustrating a continuation of the procedure in FIG. 3.

Now, a method of producing the a sound absorbing material will be described with reference to FIG. 3 to FIG. 8. Note that the method of producing the sound absorbing material according to the present disclosure is not limited to the examples described below. First, as illustrated in FIG. 3 and FIG. 4, a material 22 constituting the ventilation resistant layer 12 is prepared (a step of preparing the material constituting the ventilation resistant layer). As a specific example, a laminate is prepared in which the material 22 used as a base for the ventilation resistant layer 12 is integrated with a material 23 used as a base for the first cover layer 13, and the laminate is held between a mold M1 (first mold) and a mold M2. Note that in a case where the first cover layer 13 is not included, only the material 22 may be held between the mold M1 and the mold M2.

As described above, the material 22 constituting the ventilation resistant layer 12 is held on the mold M1 to form the ventilation resistant layer 12 (step of forming the ventilation resistant layer). For example, the first cover layer 13 may be formed along with the ventilation resistant layer 12. Furthermore, further on the outer side of the sound absorbing material 1 than a portion in which the rising portion 4 is formed (portion extending in the third direction D3), the material 22 and the material 23 held between the mold M1 and the mold M2 in the direction in which the mold M1 and the mold M2 oppose each other (the vertical direction in FIG. 4) may be formed as the thin plate layer 15.

As described above, when the ventilation resistant layer 12 is formed, a calendar roll may be used to adjust the thickness of the ventilation resistant layer 12 to a constant value. Additionally, a press may be used to adjust the thickness of the ventilation resistant layer 12 to a constant value. In addition, by making the width of a gap formed between the mold M1 and the mold M2 constant, formation may be performed such that the ventilation resistant layer 12 held between the mold M1 and the mold M2 has a constant thickness. Note that after the thickness of the ventilation resistant layer 12 is made constant by using the calendar roll, the thickness T, corresponding to the final reference value, may be set by using the press.

Figure 5:
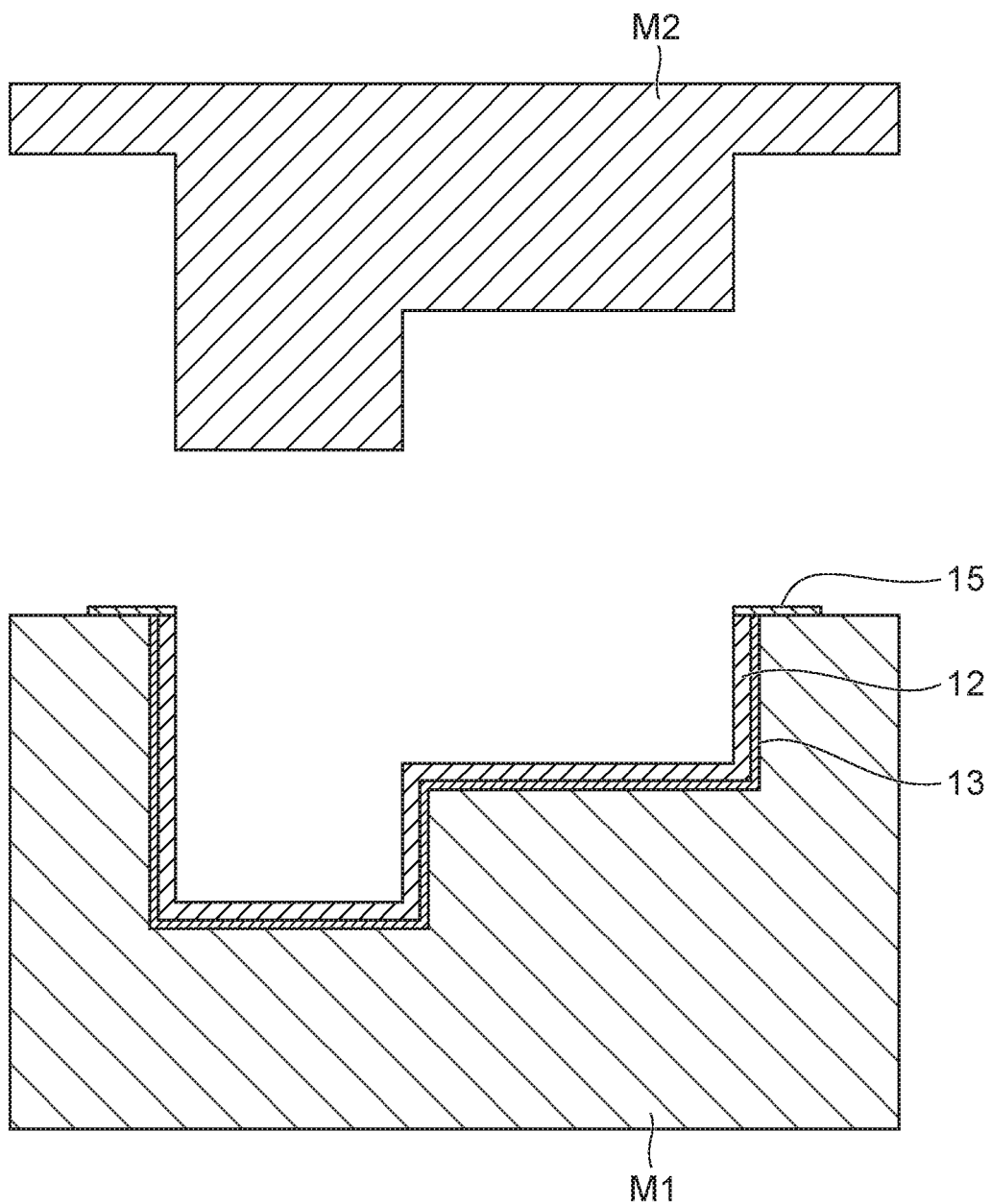
FIG. 5 is a diagram illustrating a continuation of the procedure in FIG. 4.
Figure 6:
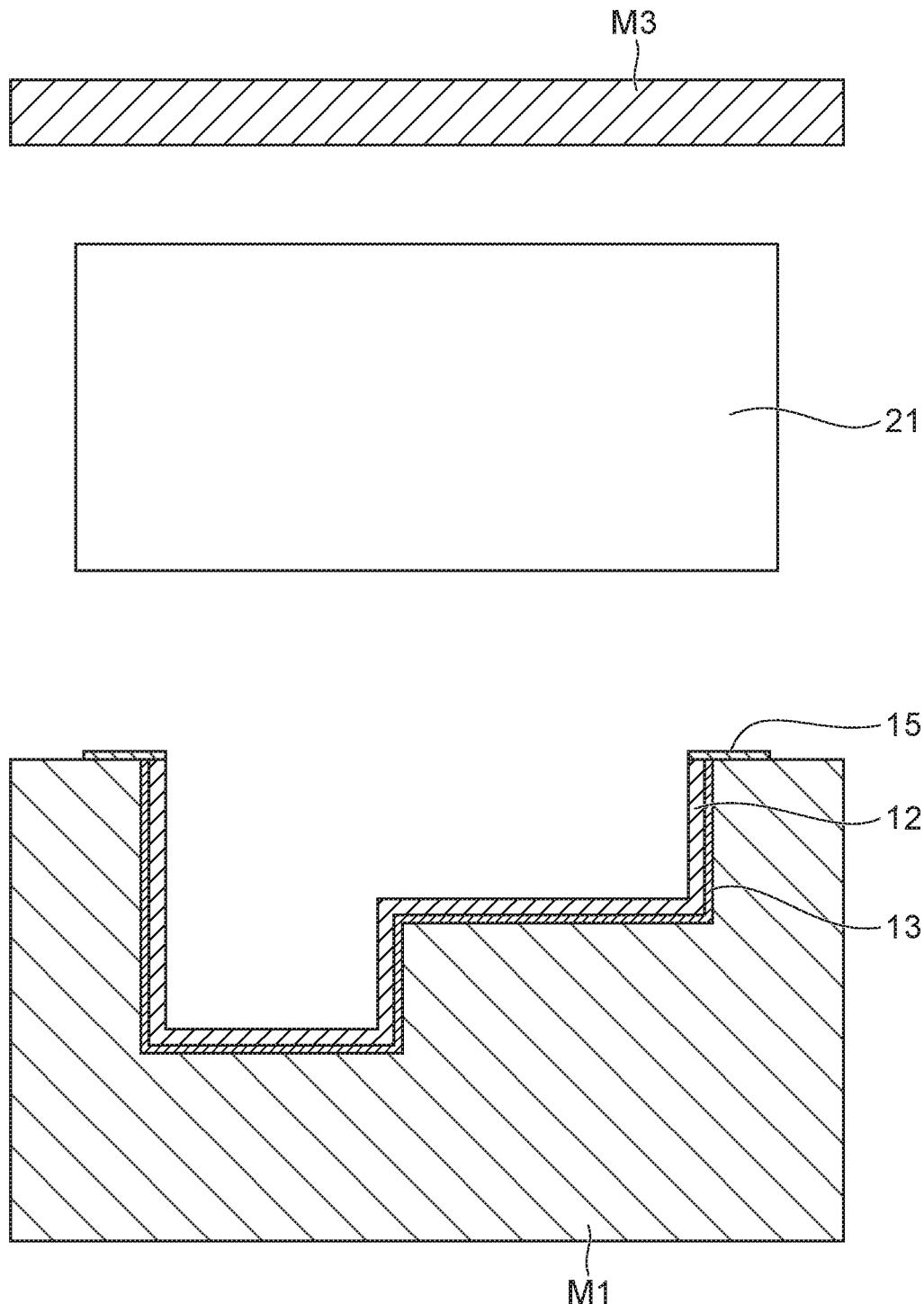
FIG. 6 is a diagram illustrating a continuation of the procedure in FIG. 5.

After the formation of the ventilation resistant layer 12 is completed, the mold M2 is removed from the ventilation resistant layer 12 and the mold M1, and a material 21 constituting the core layer 11 is prepared, as illustrated in FIG. 5 and FIG. 6 (step of preparing the material constituting the core layer). The material 21 is then held between the ventilation resistant layer 12 and a mold M3 (second mold). The mold M3 is different from the mold M2, and is shaped like, for example, a flat plate. Note that a material constituting the second cover layer 14, together with the material 21 constituting the core layer 11, may be held between the material 21 constituting the core layer 11 and the mold M3. Additionally, with the formed ventilation resistant layer 12 left in the mold M1, the mold M2 may be changed to the mold M3, the material 21 constituting the core layer 11 may be prepared, and the material 21 may be held the ventilation resistant layer 12 and the mold M3. In this case, the formation of the core layer 11 can be performed without removing the ventilation resistant layer 12 formed.

Figure 7:
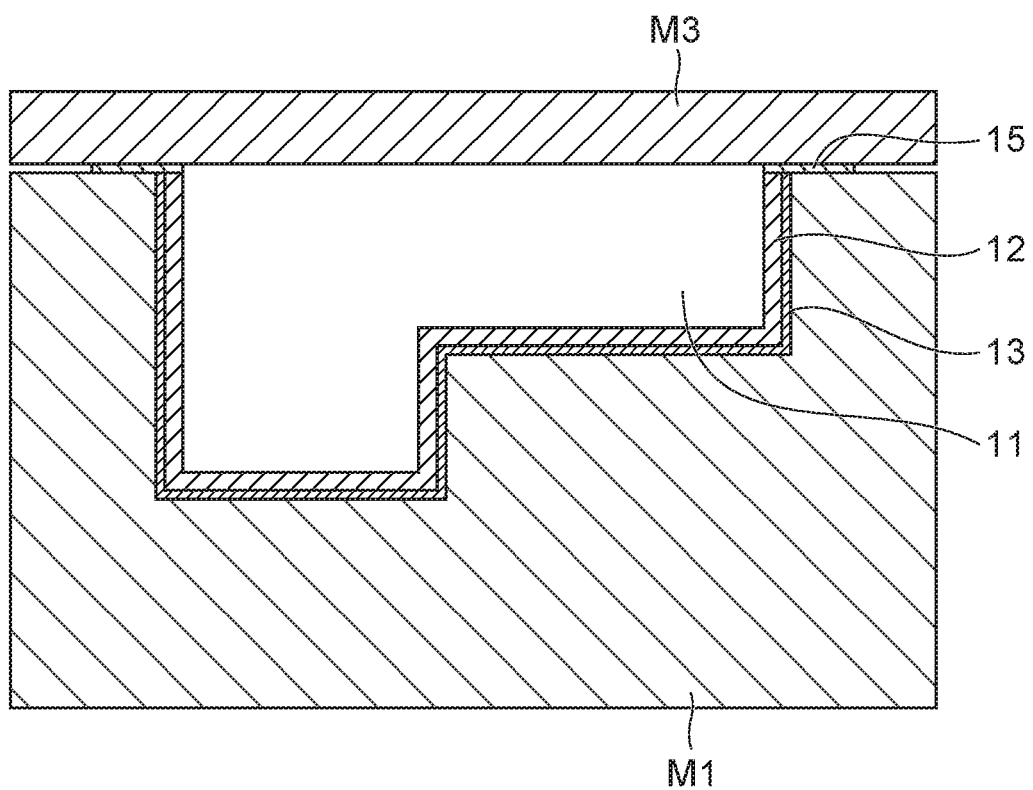
FIG. 7 is a diagram illustrating a continuation of the procedure in FIG. 6.
Figure 8:
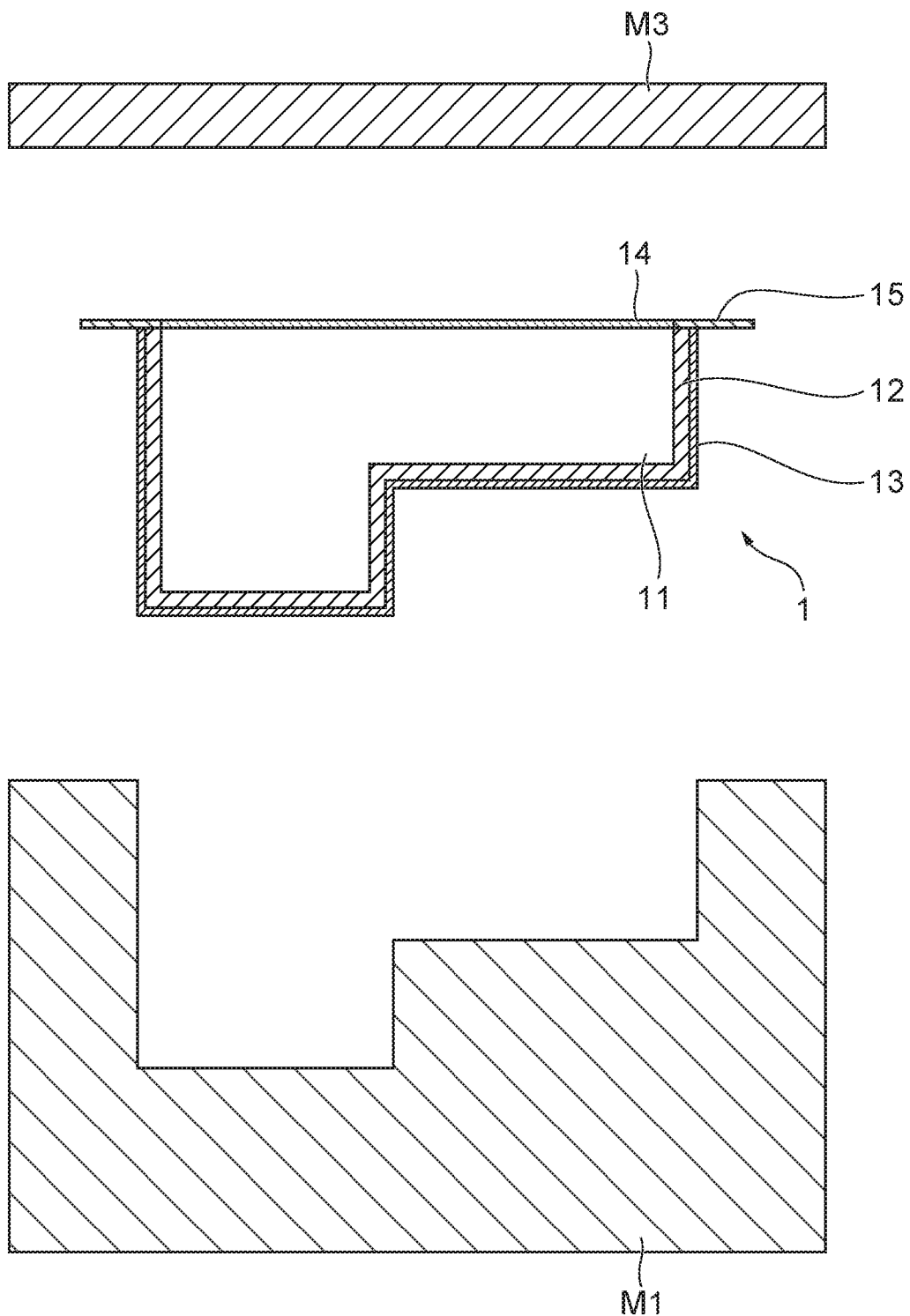
FIG. 8 is a diagram illustrating a continuation of the procedure in FIG. 7.

Then, as illustrated in FIG. 7 and FIG. 8, the material 21 is held between the ventilation resistant layer 12 and the mold M3 to form the core layer 11 (the step of forming the core layer). The second cover layer 14 may be formed with the core layer 11. After the core layer 11 is formed as described above, the mold M3 is removed to complete the sound absorbing material 1. As described above, in the embodiment, the ventilation resistant layer 12 and the core layer 11 are formed separately in two stages, allowing the thickness T of the ventilation resistant layer 12 to be easily and accurately adjusted.

Now, the action and effect of the sound absorbing material and the method of producing the sound absorbing material according to the present embodiment will be described. As illustrated in FIG. 2, the sound absorbing material 1 includes: the rising portion 4 rising from the attachment portion P; and the opposing portion 5 opposing the component on the side of the rising portion 4 opposite to the attachment portion P. Thus, the three-dimensional shape of the sound absorbing material 1 allows the sound absorbing material 1 to be used for components having complicated shapes.

Each of the rising portion 4 and the opposing portion 5 includes the core layer 11 and the ventilation resistant layer 12. Consequently, the sound absorbing performance can be improved by using the ventilation resistant layer 12 to appropriately suppress ventilation while using the core layer 11 to absorb sound. In at least a part of the ventilation resistant layer 12, a variation in the thickness T of the ventilation resistant layer 12 is 40% or less of the average value of the thickness T. In this case, the variation in the thickness T of at least a part of the ventilation resistant layer 12 is constant, and thus the sound absorption coefficient as the sound absorbing material 1 can be increased. Thus, the sound absorbing performance can be improved.

In the example sound absorbing material 1, in 80% or greater of the region including the opposing portions 5 and the rising portions 4 and including no edge portions 2, the variation in the thickness T of the ventilation resistant layer 12 may be 40% or less of the average value thereof. In this case, because the variation in the thickness T is 40% or less in 80% or greater of the above-described region of the sound absorbing material 1, the thickness T of the ventilation resistant layer 12 can be made more constant. Consequently, this contributes to further improvement in the sound absorption coefficient.

In the example sound absorbing material 1, the thickness T of the ventilation resistant layer 12 may be 1 mm or greater and 6 mm or less. In this case, because the thickness T of the ventilation resistant layer 12 is 1 mm or greater and 6 mm or less, the thickness T of the ventilation resistant layer 12 can be made uniform at the appropriate value, thus allowing sound absorption efficiency to be further increased.

In the example sound absorbing material 1, the ventilation resistance value of the ventilation resistant layer 12 may be in a range of the reference value±120 Rayls. In this case, because the ventilation resistance value is in a range of the reference value±120 Rayls, the ventilation resistance value can be made constant at an appropriate value based on the reference value, thus allowing the sound absorbing performance to be improved.

In the example sound absorbing material 1, the ventilation resistance value of the ventilation resistant layer 12 may be 300 Rayls or greater and 1100 Rayls or less. In this case, because the ventilation resistance value is 300 Rayls or greater and 1100 Rayls or less, the ventilation resistance value can be made constant at an appropriate value, thus contributing to further improvement of the sound absorbing performance.

In the example sound absorbing material 1, the ventilation resistant layer 12 may be positioned on the component side as viewed from the core layer 11. In this case, the ventilation resistant layer 12, provided on the component side, can more effectively absorb sound. Consequently, high sound absorbing performance can be maintained.

In the example sound absorbing material 1, at least one of the ventilation resistant layer 12 and the core layer 11 may include microfibers. In this case, weight reduction can be achieved with high sound absorbing performance maintained.

In the method of producing the sound absorbing material according to the embodiment, first, the material 22 of the ventilation resistant layer 12 is held between the mold M1 and the mold M2 to form the ventilation resistant layer 12. Thus, by holding the material between the mold M1 and the mold M2 to form the ventilation resistant layer 12, the thickness T of the ventilation resistant layer 12 can be made constant in the mold M1 and the mold M2. Subsequently, the mold M1 and the mold M3 are used to form the core layer 11 on the ventilation resistant layer 12 with the constant thickness T. Consequently, the sound absorbing material 1 that includes the ventilation resistant layer 12 with the constant thickness and the core layer 11 and that has high sound absorbing performance can be produced.

As described above, the forming of the ventilation resistant layer 12 may include adjusting the thickness T of the ventilation resistant layer 12 using a press or using a calendar roll and the press. In this case, the thickness T of the ventilation resistant layer 12 is adjusted using at least one of the calendar roll and the press, and thus the thickness T of the ventilation resistant layer 12 can be made constant. As described above, after the thickness of the ventilation resistant layer 12 is made constant using the calendar roll, the final thickness T may be set using the press.

The embodiments of the sound absorbing material and the method of producing the sound absorbing material according to the present disclosure have been described. However, the present disclosure is not limited to the embodiments described above. The present disclosure can be variously modified without departing from the spirits or scope set forth in the claims. Specifically, the shapes, sizes, materials, numbers, and arrangement aspects of the portions of the sound absorbing material, and the contents and the order of the steps of the method of producing the sound absorbing material can be modified as appropriate without departing from the spirits or scope described above.

Now, various examples of the sound absorbing material will be described with reference to FIG. 9 to FIG. 11. Note that the present disclosure is not limited to the examples described below. First, sound absorbing materials according to Examples 1 to 6 will be described. The specifications for each of the sound absorbing materials according to Examples 1 to 6 will be described below.

Example 1

The sound absorbing material according to Example 1 includes the core layer 11, the first cover layer 13, and the second cover layer 14, and does not include the ventilation resistant layer 12.

As the melt-blown fibers of the core layer 11, a PP resin was made by a melt-blow process into melt-blown fibers with a fiber diameter of 5 µm, and the melt-blown fibers were spun to have a weight per unit area of 315 g/m$^2$. A mixed web with a weight per total unit area of 420 g/m$^2$ was produced by blowing, against a fiber flow immediately after blowout of the melt-blown fibers, 71 g/m$^2$ PET short fibers (6.6 dT×38 mm) used as staple fibers for the core layer 11 and fibers (4.4 dT×38 mm) used as binder fibers for the core layer 11 and provided with a core portion including PET with a melting point of 260° C. and a sheath portion including low-melting-point PET with a melting point of 110° C. such that the fibers merge with the fiber flow. A sound absorbing material with the single core layer 11 was produced by applying a 40 g/m$^2$ spun-bond made of black PP, to the mixed web as a cover material using a spray-like hot melt, and applying 13 g/m$^2$ white SMS to the opposite surface using a spray-like hot melt. This original material was held on a hot press at 130° C. for 30 seconds, and the core layer 11 with a thickness of 10 mm was finished.

The weight per unit area was determined by providing five samples by cutting the original material of the core layer 11 into 10 cm×10 cm pieces, measuring the weight of each of the samples, and determining the weight per unit area from the average value of the weights thereof.

The film thickness of the core layer was measured using a measurement method according to ASTM F778-88. Specifically, five samples were prepared by cutting the original material into 10 cm×10 cm. The samples were placed in the middle between two plates of an upper plate and a lower plate. The distance between the upper and lower plates was adjusted to a height of 5 cm±0.2 cm. At this height, the upper plate was released and dropped onto the underlying plate due to the own weight of the upper plate. Then, this state was maintained for 3 seconds and the distance between the upper and lower plates was measured using a mounted micrometer.

Example 2

The same original material of the core layer 11 as that in Example 1 was finished under the same conditions as those in Example 1 using the hot press such that the core layer 11 had a thickness of 20 mm. The method of measuring the weight per unit area and the method of measuring the thickness were the same as those in Example 1.

Example 3

The same original material of the core layer 11 as that in Example 1 was finished under the same conditions as those in Example 1 using the hot press such that the core layer 11 had a thickness of 30 mm. The method of measuring the weight per unit area and the method of measuring the thickness were the same as those in Example 1.

Example 4

The sound absorbing material according to Example 4 includes the core layer 11, the ventilation resistant layer 12, the first cover layer 13, and the second cover layer 14, similarly to the sound absorbing material 1 in FIG. 2.

The same method as that in Example 1 was used for the core layer 11, and the core layer 11 included 240 g/m$^2$ melt-blown fibers, 54 g/m$^2$ PET short fibers, and 26 g/m$^2$ binder fibers, and weighed 320 g/m$^2$ in total. Then, 13 g/m$^2$ white SMS was applied to one side using a spray-like hot melt to produce an original material of the core layer 11. The original material was held on the hot press at 130° C. for 30 seconds, and the thickness of the core layer 11 was set to 9.3 mm.

The same method as that in Example 1 was used for the ventilation resistant layer 12, and the ventilation resistant layer 12 included 50 g/m$^2$ melt-blown fibers, 34 g/m$^2$ PET short fibers, and 16 g/m$^2$ binder fibers, and weighed 100 g/m$^2$ in total. Then, 40/m$^2$ black spun-bond was applied to one side using a spray-like hot melt to produce an original material of the ventilation resistant layer 12. This original material was held on the hot press at 130° C. for 30 seconds, and the thickness of the ventilation resistant layer 12 was set to 0.7 mm.

The core layer 11 and the ventilation resistant layer 12 overlapped to obtain Example 4. The method of measuring the weight per unit area and the method of measuring the thickness were the same as those in Example 1.

Example 5

The same original material of the core layer 11 as that in Example 4 was finished under the same conditions as those in Example 4 using the hot press such that the core layer 11 had a thickness of 19.3 mm. The same ventilation resistant layer 12 as that in Example 4 was used, and the core layer 11 and the ventilation resistant layer 12 overlapped to obtain Example 5. The method of measuring the weight per unit area and the method of measuring the thickness were the same as those in Example 1.

Example 6

The same original material of the core layer 11 as that in Example 4 was finished under the same conditions as those in Example 4 using the hot press such that the core layer 11 had a thickness of 29.3 mm. The same ventilation resistant layer 12 as that in Example 4 was used, and the core layer 11 and the ventilation resistant layer 12 overlapped to obtain Example 6. The method of measuring the weight per unit area and the method of measuring the thickness were the same as those in Example 1.

Figure 9:
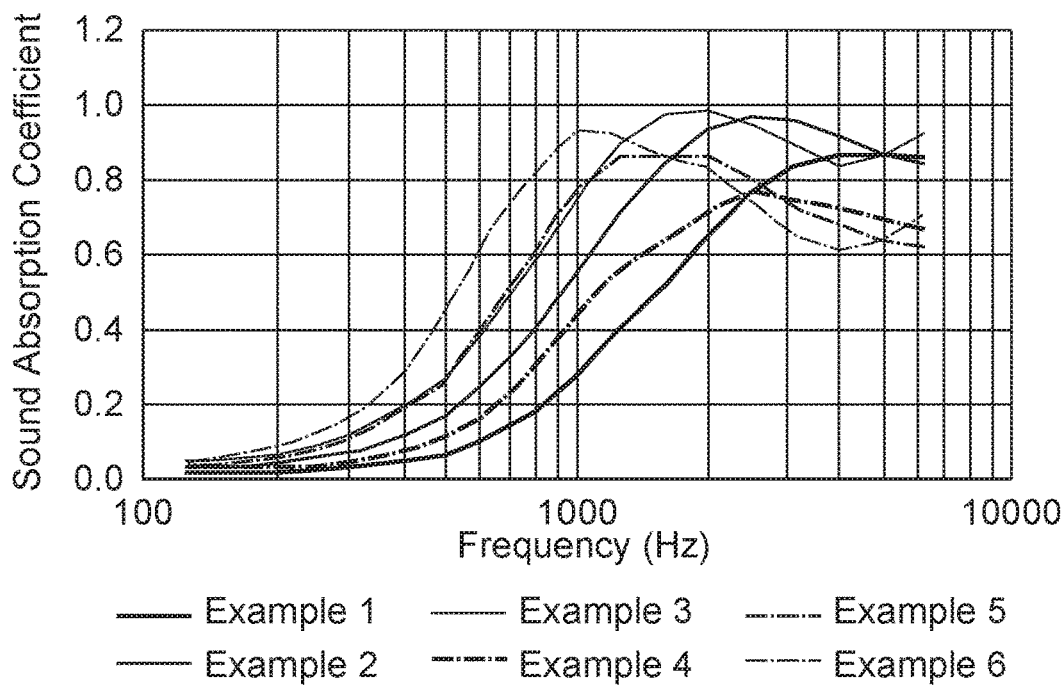
FIG. 9 is a graph showing experimental results for a sound absorption coefficient for example sound absorbing materials.

A graph of FIG. 9 indicates examples of experimental results of checking the sound absorbing performance in Examples 1 to 6 described above. The sound absorbing performance was measured by two-microphone method based on ASTM E 1050-98 ("Impedance and Absorption Using A Tube, Two Microphones and A DigitalFrequency Analysis System."). The frequency measurement range was from 500 Hz to 4000 Hz. The two-microphone method is a method of determining the sound absorption coefficient by measuring an incident component and a reflective component of sound pressure in a tube using two microphones. Additionally, the ventilation resistance value was measured in conjunction with the sound absorbing performance. The ventilation resistance value was measured based on a method predetermined in ASTM C 522. Samples were cut into circles with a diameter of 5.25 inches (133.3 mm) and fixed to a sample bed. Compressed air was fed in a direction perpendicular to a 100 cm$^2$ sheet surface of the sample, and a differential pressure generated in a direction perpendicular to the surface of the ventilation resistant layer 12 was measured. Thus, the ventilation resistance value was calculated.

The horizontal axis of the graph in FIG. 9 indicates the frequency of sound applied to the sound absorbing material, and the vertical axis of the graph in FIG. 9 indicates the sound absorption coefficient of the sound applied to the sound absorbing material. As shown in FIG. 9, the sound absorbing materials in Example 4 to 6 including the ventilation resistant layer 12 having a thickness of 0.7 mm had a ventilation resistance value of 1596 Rayls, and obtained a high sound absorption coefficient in a low frequency range of 1000 Hz or less and a low sound absorption coefficient in a high frequency range.

Examples 7 to 9 will now be described with reference to FIG. 10.

Example 7

The sound absorbing material according to example 7 differs from Example 4 in the thickness of the core layer 11 and the thickness of the ventilation resistant layer 12. In Example 7, the thickness of the core layer 11 was 7 mm, and the thickness of the ventilation resistant layer 12 was 3 mm.

Specifically, the core layer 11 was finished to a thickness of 7 mm under the same conditions as those in Example 4 using the same original material as that in Example 4 and the hot press. The ventilation resistant layer 12 was finished to 3 mm under the same conditions as those in Example 4 using the same original material as that in Example 4 and the hot press. Then, the core layer 11 and the ventilation resistant layer 12 overlapped to obtain Example 7. The method of measuring the weight per unit area and the method of measuring the thickness were the same as those in Example 1.

Example 8

In Example 8, core layer 11 was finished to a thickness of 17 mm under the same conditions as those in Example 4 using the same original material as that in Example 4 and the hot press. The same ventilation resistant layer 12 as that in Example 7 was used. The core layer 11 and the ventilation resistant layer 12 overlapped to obtain Example 8. The method of measuring the weight per unit area and the method of measuring the thickness were the same as those in Example 1.

Example 9

In Example 9, core layer 11 was finished to a thickness of 27 mm under the same conditions as those in Example 4 using the same original material as that in Example 4 and the hot press. The same ventilation resistant layer 12 as that in Example 7 was used. The core layer 11 and the ventilation resistant layer 12 overlapped to obtain Example 9. The method of measuring the weight per unit area and the method of measuring the thickness were the same as those in Example 1.

Figure 10:
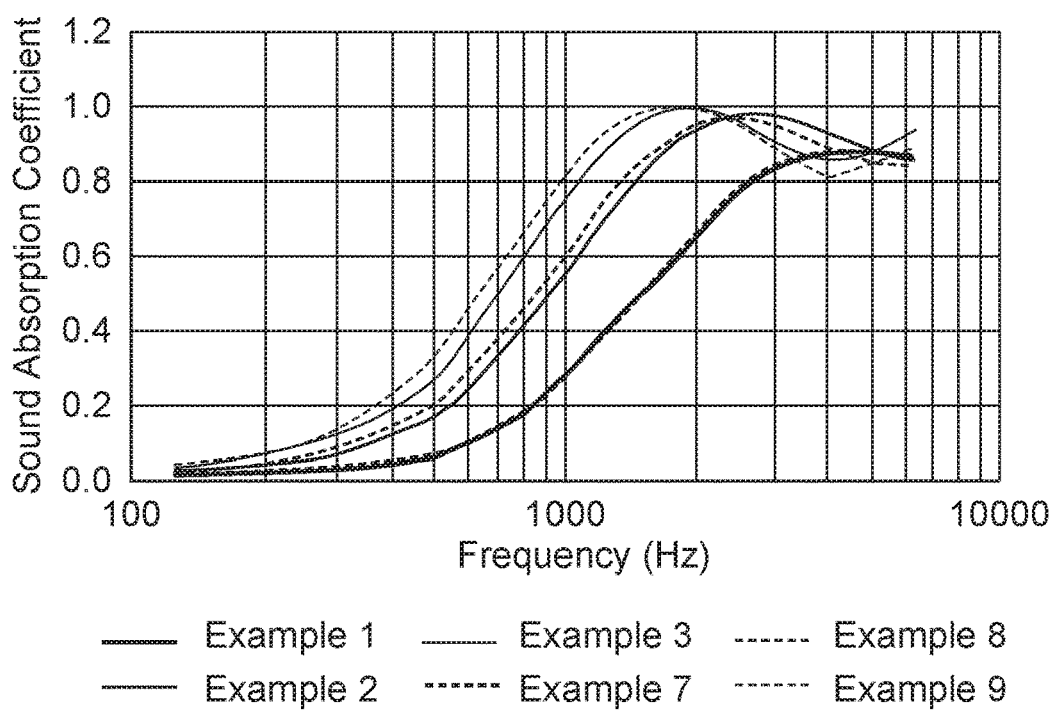
FIG. 10 is a graph showing experimental results for the sound absorption coefficient for example sound absorbing materials.

FIG. 10 is a graph indicating the results of check of the sound absorbing performance in Examples 7 to 9 described above and Examples 1 to 3 described above. In Examples 7 to 9, the ventilation resistance value was also measured in conjunction with the sound absorbing performance. The method of measuring the ventilation resistance value was the same as the method performed in Examples 4 to 6. FIG. 10 indicates that the sound absorbing materials in Examples 7 to 9 including the ventilation resistant layer 12 having a thickness of 3 mm had a ventilation resistance value of 428 Rayls and obtained a high sound absorption coefficient in a wide frequency band.

Now, Examples 10 to 12 will be described below.

Example 10

The sound absorbing material according to Example 10 differs from Example 4 in the thickness of the core layer 11 and the thickness of the ventilation resistant layer 12. In Example 10, the thickness of the core layer 11 was 4 mm, and the thickness of the ventilation resistant layer 12 was 6.2 mm.

Specifically, the core layer 11 was finished to a thickness of 4 mm under the same conditions as those in Example 4 using the same original material as that in Example 4 and the hot press. The ventilation resistant layer 12 was finished to 6.2 mm under the same conditions as those in Example 4 using the same original material as that in Example 4 and the hot press. Then, the core layer 11 and the ventilation resistant layer 12 overlapped to obtain Example 10. The method of measuring the weight per unit area and the method of measuring the thickness were the same as those in Example 1.

Example 11

In Example 11, the core layer 11 was finished to a thickness of 14 mm under the same conditions as those in Example 4 using the same original material as that in Example 4 and the hot press. The same ventilation resistant layer 12 as that in Example 10 was used. The core layer 11 and the ventilation resistant layer 12 overlapped to obtain Example 11. The method of measuring the weight per unit area and the method of measuring the thickness were the same as those in Example 1.

Example 12

In Example 12, the core layer 11 was finished to a thickness of 24 mm under the same conditions as those in Example 4 using the same original material as that in Example 4 and the hot press. The same ventilation resistant layer 12 as that in Example 10 was used. The core layer 11 and the ventilation resistant layer 12 overlapped to obtain Example 12. The method of measuring the weight per unit area and the method of measuring the thickness were the same as those in Example 1.

Figure 11:
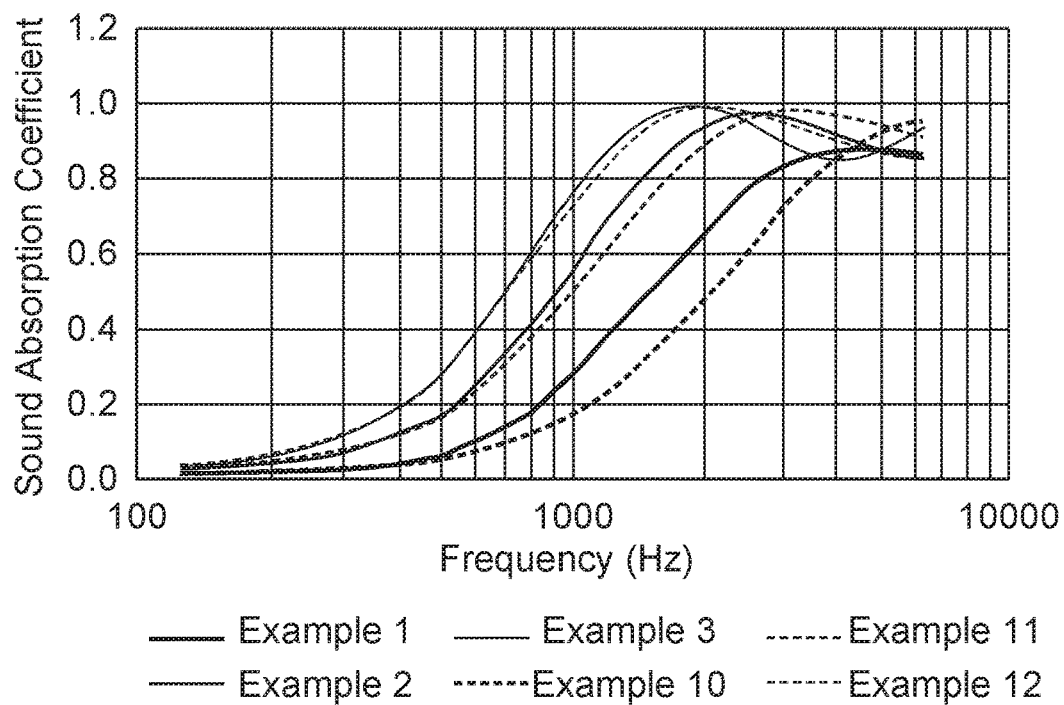
FIG. 11 is a graph showing experimental results for the sound absorption coefficient for example sound absorbing materials.

FIG. 11 is a graph indicating the results of check of the sound absorbing performance in Examples 10 to 12 described above and Examples 1 to 3 described above. In Examples 10 to 12, the ventilation resistance value was also measured in conjunction with the sound absorbing performance. The method of measuring the ventilation resistance value was the same as the method performed in Examples 4 to 6. As illustrated in FIG. 11, the sound absorbing materials in Example 10 to 12 including the ventilation resistant layer 12 having a thickness of 6.2 mm had a ventilation resistance value of 271 Rayls, and obtained a high sound absorption coefficient in a high frequency range of 2000 Hz or greater but a low sound absorption coefficient in a low frequency range.

Figure 12:
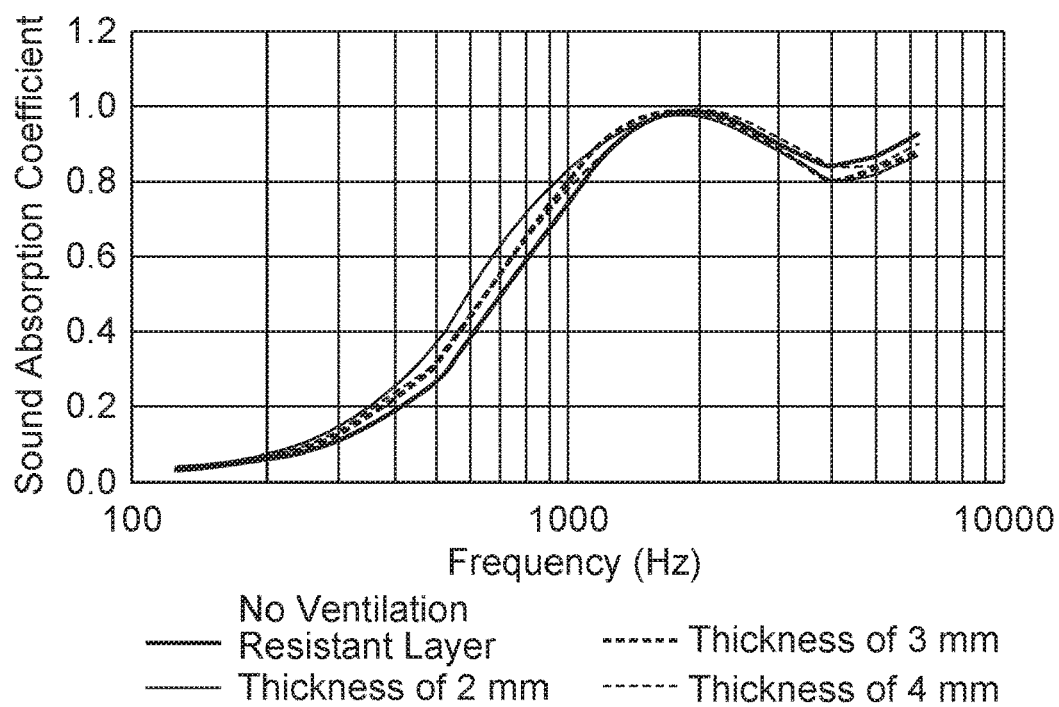
FIG. 12 is a graph showing the relationship between the frequency of sound and the sound absorption coefficient for different thicknesses of the ventilation resistant layer.

FIG. 12 indicates the results of verification in which for the ventilation resistant layer 12, a thickness of 3 mm and a ventilation resistance value of 428 Rayls are used as reference values and in which the thickness of the ventilation resistant layer 12 is set±1 mm to the reference value, based on the results in FIG. 9 to FIG. 11 described above. FIG. 12 indicates the results of a comparative example not including the ventilation resistant layer 12 (Example 3, no ventilation resistant layer), Example 9 including the ventilation resistant layer 12 with a thickness of 3 mm (3 mm thick), and an experiment in which in Example 9, the thickness of the ventilation resistant layer 12 was further changed to 2 mm or 4 mm.

In an example where the thickness of the ventilation resistant layer 12 was 2 mm, the core layer 11 was finished to a thickness of 28 mm under the same conditions as those in Example 4 using the same original material as that in Example 4 and the hot press. The ventilation resistant layer 12 was finished to a thickness of 2 mm under the same conditions as those in Example 4 using the same original material as that in Example 4 and the hot press. The core layer 11 and the ventilation resistant layer 12 overlapped to obtain a 2 mm sample. As described above, the example including the ventilation resistant layer 12 with a thickness of 3 mm is the same as Example 9.

In the example including the ventilation resistant layer 12 with a thickness of 4 mm, the core layer 11 was finished to a thickness of 26 mm under the same conditions as those in Example 4 using the same original material as that in Example 4 and the hot press. The ventilation resistant layer 12 was finished to a thickness of 4 mm under the same conditions as those in Example 4 using the same original material as that in Example 4 and the hot press. The core layer 11 and the ventilation resistant layer 12 overlapped to obtain a 4 mm sample. In each of the examples illustrated in FIG. 12, the ventilation resistance value was also measured in conjunction with the sound absorbing performance. The method of measuring the ventilation resistance value was the same as the method performed in Examples 4 to 6.

FIG. 12 indicates that even the sound absorbing material including the ventilation resistant layer 12 with a thickness of 2 mm or 4 mm, as well as the example with a thickness of 3 mm (Example 9), can obtain a higher sound absorption coefficient than the example not including the ventilation resistant layer 12 (Example 3). Note that the ventilation resistant layer 12 with a thickness of 2 mm led to a ventilation resistance value of 534 Rayls and that the ventilation resistant layer 12 with a thickness of 4 mm led to a ventilation resistance value of 317 Rayls. Consequently, it has been found that good results are obtained when the variation in the thickness of the ventilation resistant layer 12 is set±40% to the reference value (3 mm) and the ventilation resistance value is set±120 Rayls to the reference value (428 Rayls).

Figure 13:
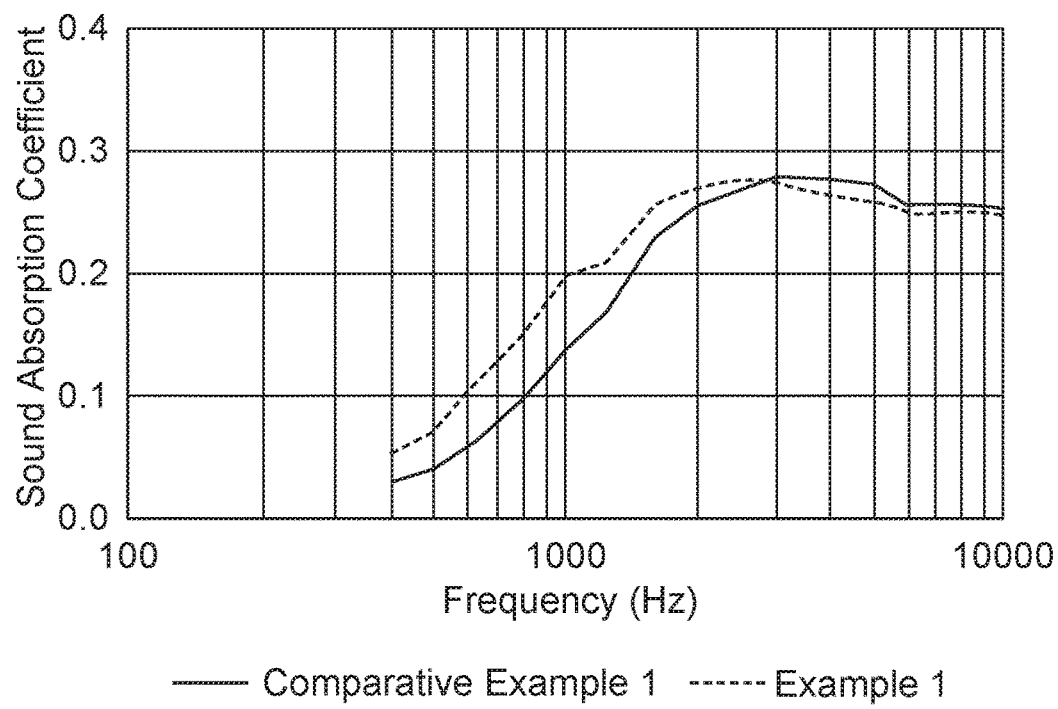
FIG. 13 is a graph showing experimental results for the sound absorption coefficient for sound absorbing materials in Example and Comparative Example.

Example 1 and Comparative Example 1 will be described below with reference to FIG. 13.

Example 1

In Example 1, the ventilation resistant layer 12 and the core layer 11 were formed separately in two stages to produce a sound absorbing material, as illustrated in FIG. 3 to FIG. 8. Example 1 includes the core layer 11, the ventilation resistant layer 12, the first cover layer 13, and the second cover layer 14, which will be described below.

For the ventilation resistant layer 12, the same original material as that in Example 4 was used, and the ventilation resistant layer 12 was placed in a metal mold and held at 130° C. for 30 seconds to form a 3D shape with a thickness of 3 mm. Additionally, one ventilation resistant layer 12 formed at this point of time was removed, and the thickness of the ventilation resistant layer 12 was measured in a non-contact manner.

For the core layer 1, the same original material as that in Example 4 was used, and as described above, the core layer 11 was placed in a metal mold along with the molded ventilation resistant layer 12 and held at 130° C. for 30 seconds for formation.

Figure 15A:
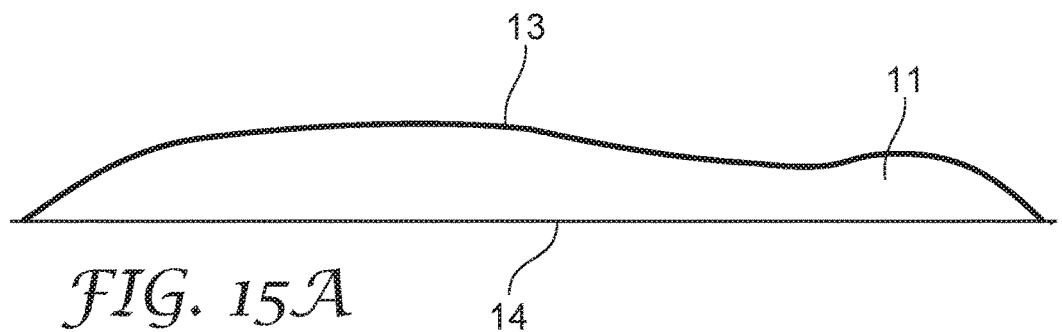
FIGS. 15(a) and 15(b) are diagrams respectively illustrating cross-sections of the sound absorbing materials in Comparative Example and Example.
Figure 15B:
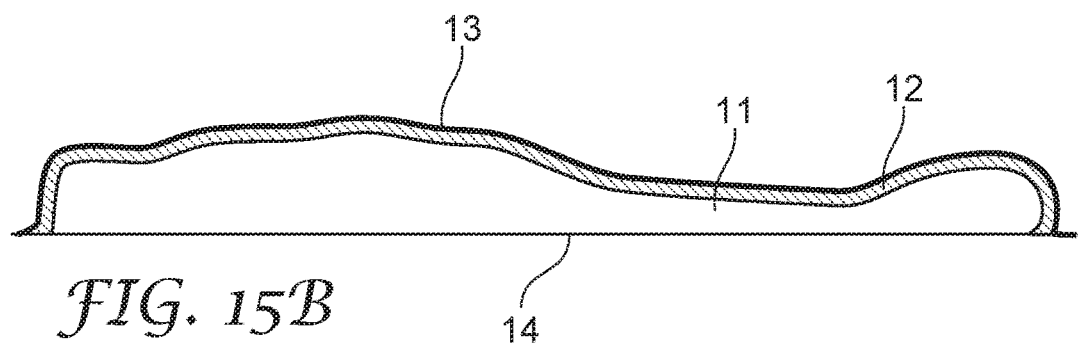

Then, the finished sound absorbing material was stationarily placed in a reverberation chamber, and the sound absorption coefficient was measured. Additionally, the samples of the sound absorbing material for which measurement was ended were cut, and the cross-sections of the samples were visually observed as illustrated in FIG. 15(b). Confirmation was obtained as to the formation of the ventilation resistant layer 12 to a constant thickness. Then, the thickness of the ventilation resistant layer 12 three-dimensionally formed was measured using a non-contact laser displacement meter. Table 1 below indicates the thickness of the opposing portion 5 and the thickness of the rising portion 4 in the ventilation resistant layer 12 in Example 1.

TABLE 1

| Thickness (mm) | 1 | 2 | 3 | 4 | 5 | Average | Maximum value | +% | Minimum value | -% |
|---|---|---|---|---|---|---|---|---|---|---|
| Opposing portion | 3.20 | 3.00 | 3.40 | 3.16 | 3.48 | 3.25 | 3.48 | 16.0 | 3.00 | 0.0 |
| Rising portion | 3.20 | 3.30 | 3.20 | 3.40 | 2.84 | 3.19 | 3.40 | 13.3 | 2.84 | 5.3 |

Comparative Example 1

The sound absorbing material according to Comparative Example 1 includes the core layer 11, the first cover layer 13, and the second cover layer 14, and does not include the ventilation resistant layer 12.

In Comparative Example 1, which did not include the ventilation resistant layer 12, the same original material as that in Example 1 was used and placed in the above-described metal mold. Only the procedure in FIG. 6 to FIG. 8 was used, and the original material was held at 130° C. for 30 seconds and formed into a 3D shape including the single core layer 11. The samples for which measurement was ended were cut, and cross-sectional views were observed as illustrated in FIG. 15(*a*).

The sound absorption coefficient was measured for Example 1 and Comparative Example 1 described above. The sound absorption coefficient of each of the sound absorbing materials formed was measured based on JIS A 1409 using an ABLoss sound absorption coefficient and sound transmission loss measurement system made by Nihon Onkyo Engineering Co., Ltd. As a result, as illustrated in FIG. 13, it has been found that the sound absorbing material in Example 1 in which the ventilation resistant layer 12 with a thickness of 3 mm and the core layer 11 are formed in two stages can obtain a high sound absorption coefficient in a wide frequency band (particularly in a low frequency range) having a frequency of 3000 Hz or less.

Figure 14:
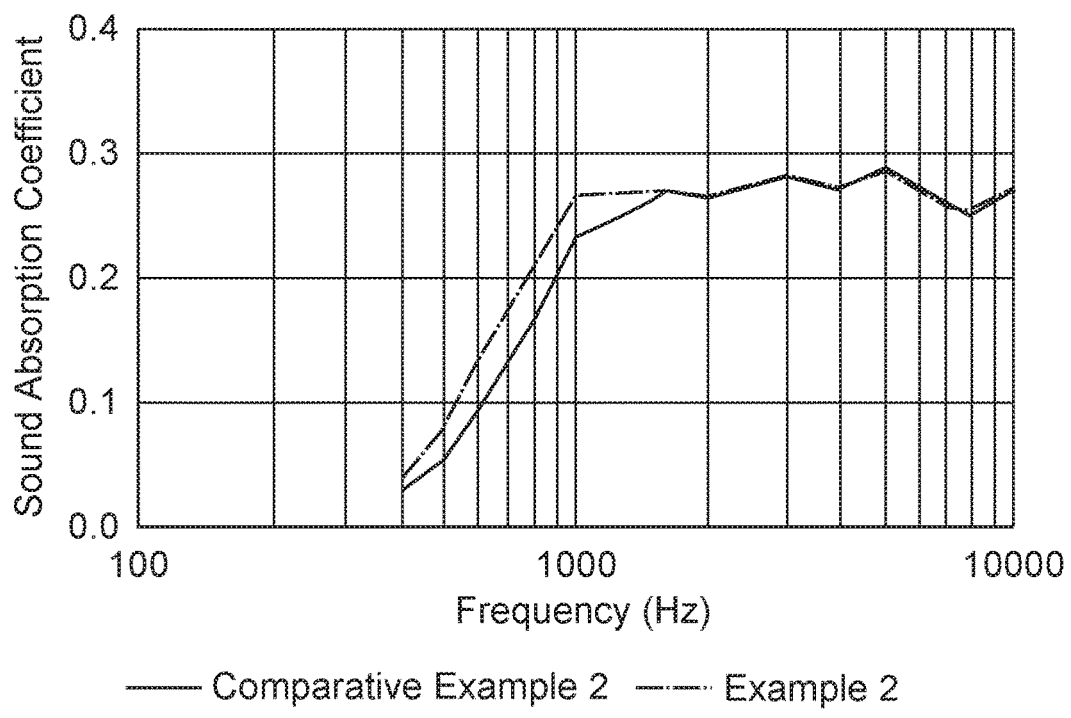
FIG. 14 is a graph showing experimental results for the sound absorption coefficient for sound absorbing materials in Example and Comparative Example.

Now, Example 2 and Comparative Example 2 will be described below with reference to FIG. 14.

Example 2

For the ventilation resistant layer 12, the same original material as that in Example 4 was used, and the ventilation resistant layer 12 was placed into the above-described metal mold, held at 130° C. for 30 seconds, and formed into a 3D shape with a thickness of 3 mm. Additionally, at this point of time, one ventilation resistant layer 12 formed was removed, and the thickness of the ventilation resistant layer 12 was measured in a non-contact manner.

For the core layer 11, the same method as that in Example 1 was used, and a PP resin was made, by a melt-blow process, into melt-blown fibers with a fiber diameter of 5 μm, and the melt-blown fibers were spun to have a weight per unit area of 628 g/m². A mixed web with a weight per total unit area of 785 g/m² was produced by blowing, as porous particles, 157 g/cm² activated carbon against a fiber flow immediately after blowout of the melt-blown fibers such that the activated carbon merges with the fiber flow. In addition, 17 g/m² white SMS was applied to the surface of the ventilation resistant layer 12 opposite to the sound source side using a spray-like hot melt to form the core layer 11. The core layer 11 was placed in the metal mold along with the molded ventilation resistant layer 12 as described above and held at 130° C. for 30 seconds for formation.

Figure 16A:
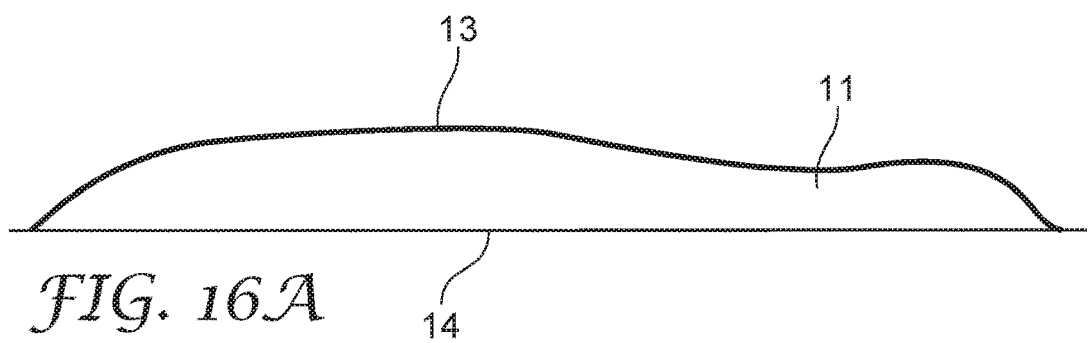
FIGS. 16(a) and 16(b) are diagrams respectively illustrating cross-sections of the sound absorbing materials in Comparative Example and Example.
Figure 16B:
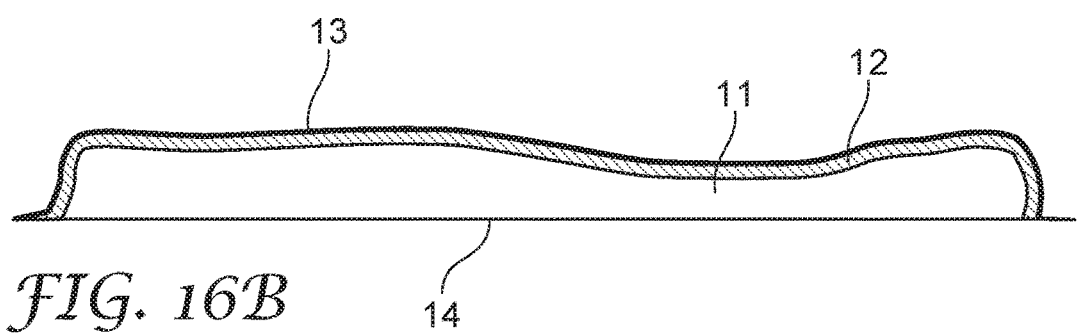

Then, the finished sound absorbing material was stationarily placed in the reverberation chamber, and the sound absorption coefficient was measured. Additionally, the samples for which measurement was ended were cut, and the cross-sections were observed as illustrated in FIG. 16(*b*), and confirmation was obtained as to the formation of the ventilation resistant layer 12 to a constant thickness. Then, the thickness of the ventilation resistant layer 12 three-dimensionally formed was measured using a non-contact laser displacement meter. Table 2 indicates the thickness of the opposing portion 5 and the thickness of the rising portion 4 in the ventilation resistant layer 12 in Example 2.

TABLE 2

| Thickness (mm) | 1 | 2 | 3 | 4 | 5 | Average | Maximum value | +% | Minimum value | -% |
|---|---|---|---|---|---|---|---|---|---|---|
| Opposing portion | 3.41 | 3.29 | 3.30 | 2.98 | 3.33 | 3.26 | 3.41 | 13.7 | 2.98 | 0.7 |
| Rising portion | 2.88 | 3.10 | 2.80 | 2.80 | 2.83 | 2.88 | 3.10 | 3.3 | 2.80 | 6.7 |

Comparative Example 2

In Comparative Example 2, the same ventilation resistant layer 12 as that in Example 2 was used. The same core layer 11 as that in Example 2 was used. The core layer 11 and the ventilation resistant layer 12 were simultaneously placed in the metal mold and held at 130° C. for 30 seconds and formed into a 3D shape. The finished sound absorbing material was placed in the reverberation chamber, and the sound absorption coefficient was measured. The samples for which measurement was ended were cut, and the cross-sections were observed as illustrated in FIG. 16(*a*) and compared with the cross-sections in Example 2. Note that, as illustrated in FIG. 16(*a*), in Comparative Example 2, the boundary between the core layer 11 and the ventilation resistant layer 12 was unclear, and thus that the ventilation resistant layer 12 is not illustrated.

The sound absorption coefficient was measured for Example 2 and Comparative Example 2 described above. The sound absorption coefficient of each of the sound absorbing materials formed was measured based on JIS A 1409 using the ABLoss sound absorption coefficient and sound transmission loss measurement system made by Nihon Onkyo Engineering Co., Ltd. As a result, as illustrated in FIG. 14, it has been found that Example 2 including the ventilation resistant layer 12 with the thickness adjusted to 3 mm can obtain a high sound absorption coefficient in a wide frequency band (particularly in a low frequency range) having a frequency of 3000 Hz or less, compared to Compared Example 2 including the ventilation resistant layer 12 with the thickness unadjusted.

The invention claimed is:

1. A sound absorbing material comprising:
   a rising portion rising from a base plane, and an opposing portion in contact with a side of the rising portion opposite to the base plane, wherein
   each of the rising portion and the opposing portion includes a core layer and a ventilation resistant layer, and
   in at least a part of the opposing portion and the rising portion, a variation in thickness of the ventilation resistant layer is 40% or less of an average value of the thickness of the ventilation resistant layer.

2. The sound absorbing material according to claim 1, wherein
   in 80% or greater of a region of the sound absorbing material that includes the opposing portion and the rising portion and that includes no edge portions, the variation in the thickness of the ventilation resistant layer is 40% or less of the average value.

3. The sound absorbing material according to claim 1, wherein the ventilation resistant layer has a thickness of 1 mm or greater and 6 mm or less.

4. The sound absorbing material according to claim 1, wherein the ventilation resistant layer has a ventilation resistance value in a range of a reference value±120 Rayls.

5. The sound absorbing material according to claim 1, wherein the ventilation resistant layer has a ventilation resistance value of 300 Rayls or greater and 1100 Rayls or less.

6. The sound absorbing material according to claim 1, wherein the ventilation resistant layer is positioned on a side of the component as viewed from the core layer.

7. The sound absorbing material according to claim 1, wherein at least one of the ventilation resistant layer and the core layer includes microfibers.

8. A method of producing a sound absorbing material comprising a core layer and a ventilation resistant layer, the method comprising the steps of:
   preparing a material constituting the ventilation resistant layer;
   holding, on a first mold, the material constituting the ventilation resistant layer and forming the ventilation resistant layer; and
   holding, between the ventilation resistant layer and a second mold, a material constituting the core layer and forming the core layer.

9. The method of producing the sound absorbing material according to claim 8, wherein the forming of the ventilation resistant layer comprises adjusting thickness of the ventilation resistant layer using a press or using a calendar roll and the press.

* * * * *